United States Patent
Ogawa et al.

(10) Patent No.: US 9,485,453 B2
(45) Date of Patent: Nov. 1, 2016

(54) MOVING IMAGE PLAYER DEVICE

(71) Applicant: KABUSHIKI KAISHA TOSHIBA, Tokyo (JP)

(72) Inventors: Takaya Ogawa, Kanagawa (JP); Akira Moriya, Kanagawa (JP); Kazuyo Kanou, Kanagawa (JP); Atsushi Mochizuki, Kanagawa (JP); Hajime Matsui, Kanagawa (JP); Shuou Nomura, Kanagawa (JP); Shunichi Ishiwata, Chiba (JP); Yoshiro Tsuboi, Chiba (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 68 days.

(21) Appl. No.: 14/195,730

(22) Filed: Mar. 3, 2014

(65) Prior Publication Data
US 2015/0071605 A1 Mar. 12, 2015

(30) Foreign Application Priority Data

Sep. 10, 2013 (JP) .................. 2013-187572

(51) Int. Cl.
| | |
|---|---|
| H04N 9/88 | (2006.01) |
| H04N 5/93 | (2006.01) |
| G11B 27/00 | (2006.01) |
| H04N 5/92 | (2006.01) |
| H04N 5/775 | (2006.01) |
| G11B 27/28 | (2006.01) |
| H04N 5/78 | (2006.01) |
| H04N 5/783 | (2006.01) |

(52) U.S. Cl.
CPC ............. *H04N 5/775* (2013.01); *G11B 27/005* (2013.01); *G11B 27/28* (2013.01)

(58) Field of Classification Search
USPC ....... 386/271, 263, 278, 280, 283, 314, 326, 386/343
See application file for complete search history.

(56) References Cited

U.S. PATENT DOCUMENTS 5,982,440 A 11/1999 Aoki
7,343,044 B2 3/2008 Baba et al.
(Continued)

FOREIGN PATENT DOCUMENTS

JP 61-125295 6/1986
JP 04-079509 12/1992
(Continued)

OTHER PUBLICATIONS

U.S. Appl. No. 14/461,693, filed Aug. 18, 2014, Ogawa.
(Continued)

*Primary Examiner* — Daquan Zhao
(74) *Attorney, Agent, or Firm* — Knobbe, Martens, Olson & Bear LLP

(57) ABSTRACT

A moving image player device of the present invention includes an interpolated image generating unit that generates an interpolated frame corresponding to a time between two adjacent input frames using two input frames among the plurality of input frames, and a video playing unit that detects a scene change in the video, outputs the plurality of input frames or the interpolated frames in time series based on the detection result, and plays the video at an arbitrary playing speed. When the scene change is detected, the video playing unit skips a display of the interpolated frames corresponding to time between an input frame at the end of a first scene and an input frame at the head of a second scene, and displays an input frame of the second scene or the interpolated frame after the input frame at the end of the first scene or the interpolated frame.

6 Claims, 27 Drawing Sheets

(56) References Cited

U.S. PATENT DOCUMENTS

| | | | |
|---|---|---|---|
| 7,548,276 B2 | 6/2009 | Mizuhashi et al. | |
| 8,570,436 B2 | 10/2013 | Nakamura et al. | |
| 2004/0165662 A1* | 8/2004 | Battistella | 375/240.01 |
| 2005/0157792 A1 | 7/2005 | Baba et al. | |
| 2005/0253964 A1* | 11/2005 | Janssen et al. | 348/459 |
| 2007/0140347 A1 | 6/2007 | Moon et al. | |
| 2008/0007614 A1* | 1/2008 | Mizuhashi et al. | 348/14.01 |
| 2010/0142619 A1 | 6/2010 | Suzuki et al. | |
| 2010/0157162 A1* | 6/2010 | Oshikiri et al. | 348/699 |
| 2010/0302438 A1* | 12/2010 | Fujisawa et al. | 348/441 |
| 2012/0176537 A1 | 7/2012 | Nakamura et al. | |
| 2015/0264385 A1 | 9/2015 | Ogawa | |

FOREIGN PATENT DOCUMENTS

| | | |
|---|---|---|
| JP | H07-107465 | 4/1995 |
| JP | 09-214899 | 8/1997 |
| JP | H09-238314 | 9/1997 |
| JP | H10-093920 | 4/1998 |
| JP | 2003-069961 | 3/2003 |
| JP | 2005-204066 | 7/2005 |
| JP | 2005-347841 | 12/2005 |
| JP | 2006-197256 | 7/2006 |
| JP | 2007-181674 | 7/2007 |
| JP | 2009-044329 | 2/2009 |
| JP | 2009-206940 | 9/2009 |
| JP | 4396496 | 10/2009 |
| JP | 2010-136292 | 6/2010 |
| JP | 2010-166386 | 7/2010 |
| JP | 2011-139211 | 7/2011 |
| JP | 2012-142874 | 7/2012 |

OTHER PUBLICATIONS

Japanese Office Action for Japanes Patent App No. 2013-187572, mailed Dec. 8, 2015, in 6 pages.

* cited by examiner

AT TIME OF 1X SPEED PLAYING

AT TIME OF 0.3X SPEED PLAYING

MOVING IMAGE PLAYER DEVICE

CROSS-REFERENCE TO RELATED APPLICATIONS

This application is based upon and claims the benefit of priority from the prior Japan Patent Application No. 2013-187572, filed on 10 Sep. 2013, the entire contents of which are incorporated herein by reference.

FIELD

Embodiments described herein relate generally to a moving image player device.

BACKGROUND

Smooth slow moving image interpolation playing is a playing method of receiving a moving image having a certain frame rate and smoothly performing playing at a speed slower than a certain speed. In this playing method, a motion search is performed on an input original image, an interpolated image is generated using the motion vector, and display is performed inserting the interpolated image between the frames of the original image. Thus, it is possible to prevent the same frame of the original image from being displayed multiple times and implement smooth slow playing.

As a process similar to the smooth slow moving image interpolation playing, there is frame rate conversion (FRC) based on motion compensation. This is a process of converting a moving image having a first frame rate into a moving image having a second frame rate. For example, it corresponds to a process of converting a frame rate of 60 fps into 120 fps that is twice the frame rate when a moving image of a frame rate of 60 fps is displayed on a liquid crystal panel having a display capability of 120 fps. At this time, the image having the second frame rate is obtained by generating an interpolated frame based on motion compensation and inserting the interpolated image between the frames of the original image. Through this operation, the converted moving image is more smoothly displayed.

Meanwhile, there are cases in which a scene change is contained in a moving image. When an interpolated image is generated using the frames before and after the scene change, motion compensation is performed using images having no correlation, and so a distorted image is generated. In this regard, in the FRC process, when a scene change is detected, a process different from normal interpolation is performed. For example, when a scene change is detected, a frame preceding or following the scene change in time is inserted as an interpolated frame without any change. Alternatively, an average of the preceding and following frames is output.

However, when this interpolation process is applied to the smooth slow moving image interpolation playing, an image that is smoothly moving is displayed stopped around the scene change. For example, in 1/100× slow motion playing, 99 frames of interpolated images are generated between two frames of an original image. When the interpolated images are presented on a display device of 60 fps, the moving image stops for nearly two seconds and is unnaturally viewed.

DETAILED DESCRIPTION

A moving image player device according to an embodiment of the present invention includes a video input unit that receives a video including a plurality of consecutive input frames, an interpolated image generating unit that generates an interpolated frame corresponding to a time between two adjacent input frames using the two input frames among the plurality of input frames, and a video playing unit that detects a scene change in the video, outputs the plurality of input frames or the interpolated frames in time series based on the detection result, and plays the video at an arbitrary playing speed. When the scene change is detected, the video playing unit skips a display of the interpolated frames corresponding to time between an input frame at the end of a first scene and an input frame at the head of a second scene, and displays an input frame of the second scene or the interpolated frame after the input frame at the end of the first scene or the interpolated frame.

Hereinafter, exemplary embodiments of the present invention will be described in detail with reference to the appended drawings.

First Embodiment

Figure 1:
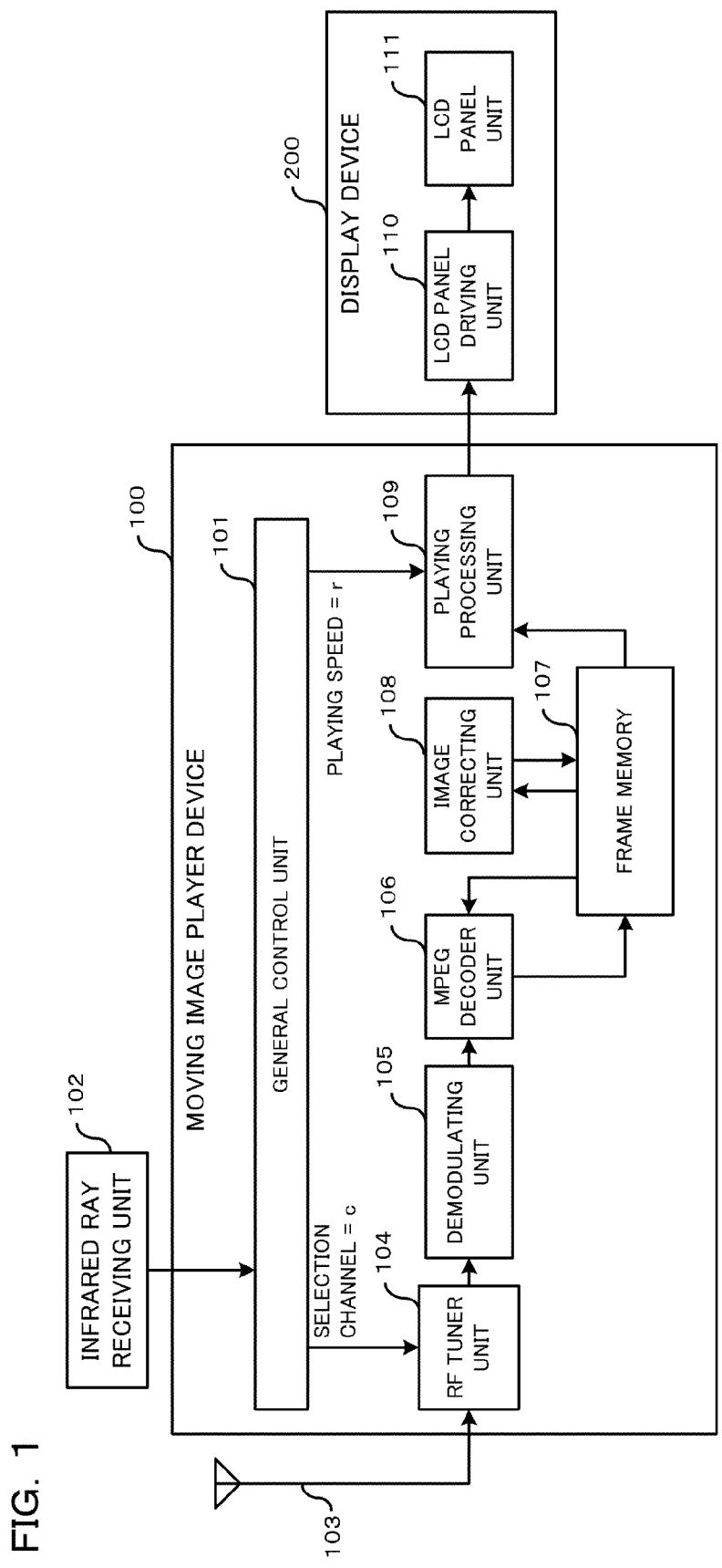
FIG. 1 is a block diagram of a moving image player device according to a first embodiment of the present invention.

FIG. 1 is a block diagram of a moving image player device 100 according to the present embodiment. The moving image player device 100 includes a general control unit 101, an RF tuner unit 104, a demodulating unit 105, an MPEG decoder unit 106, a frame memory 107, an image correcting unit 108, and a playing processing unit 109. The moving image player device 100 is connected to an infrared ray receiving unit 102 and a display device 200. The infrared ray receiving unit 102 receives infrared rays output from a remote controller (not illustrated) according to a user's operation, and outputs a received light signal to the general control unit 101. The general control unit 101 outputs control information for changing a selected channel number c to the RF tuner unit 104 based on the received light signal including the user's selected channel information, and outputs control information for changing a playing speed r to the playing processing unit 109. The general control unit 101 is a control device such as a central process unit (CPU) that controls respective components configuring the moving image player device 100.

The RF tuner unit 104 decides a frequency of a broadcast wave to be received based on the control information of the selected channel number c, and outputs an intermediate frequency (IF) signal to the demodulating unit 105. An antenna 103 installed outside the moving image player device 100 is connected with the RF tuner unit 104 by a wiring, and transfers the received radio wave to the RF tuner unit 104.

The demodulating unit 105 demodulates the IF signal modulated by various modulation schemes (for example, OFDM or VSB) into an MPEG transport stream, and outputs the MPEG transport stream to the MPEG decoder unit 106. The modulation scheme is based on a digital broadcasting standard (for example, ISDB, ATSC, or DVB).

The MPEG decoder unit 106 decodes an MPEG transport stream based on a coding scheme such as MPEG2 or MPEG4/AVC (H.264), and outputs the decoded image to the frame memory 107. A frame rate fv of the decoded image is encoded in an MPEG transport stream, and has a value such as 24 fps or 30 fps. Further, the MPEG decoder unit 106 has a function of reading a reference image from the frame memory 107, and performs decoding using motion compensation. The frame memory 107 is a storage unit such as a DRAM having the capacity capable of storing, for example, 16 decoded frames.

The image correcting unit 108 reads the decoded image written in the frame memory 107 at the frame rate fv. The image correcting unit 108 performs, for example, the following image processing, and writes the processing result in the frame memory 107 at the frame rate fv.

(1) Gamma correction or more detailed tone curve correction process
(2) Brightness or contrast adjustment process
(3) Process of enlarging a color difference of a decoded image of a YUV4:2:0 format to be converted into a YUV4:4:4 format
(4) Process of performing pixel aspect ratio conversion, enlargement and pillar box conversion on a video being broadcast at an SD resolution of 720×480 pixels to be converted into an HD resolution
(5) Process of enlarging a horizontal resolution of a broadcast wave being broadcast at 1440×1080 pixels to be converted into 1920×1080 pixels The playing processing unit 109 reads an image written in the frame memory 107 from the image correcting unit 108 again based on a reading speed which is based on a playing speed r designated from the general control unit 101, a frame rate fv of the decoded image written in the frame memory, and a display frame rate fp of an LCD panel unit 111, and outputs the processing result to the LCD panel driving unit 110.

The display device 200 further includes the LCD panel driving unit 110 and the LCD panel unit 111. The LCD panel driving unit 110 outputs the video to be displayed (a normal moving image or a smooth slow moving image) to the LCD panel unit 111 together with LCD panel control signals such as a horizontal synchronization signal and a vertical synchronization signal.

Figure 2:
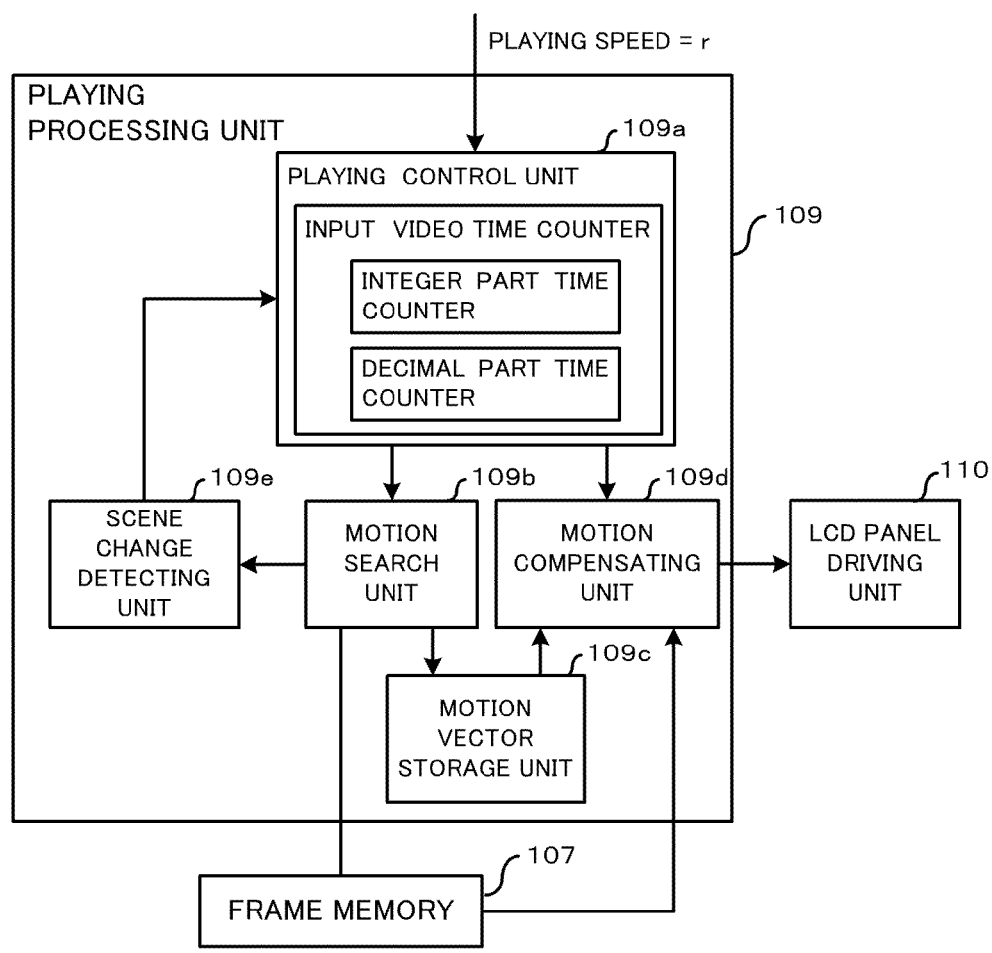
FIG. 2 is a block diagram of a playing processing unit.

FIG. 2 is a block diagram of the playing processing unit 109. A playing control unit 109a serving as a video playing unit receives the control information of the playing speed r from the general control unit 101, and receives a scene change detection result flag from a scene change detecting unit 109e. The playing control unit 109a derives a read address of the frame memory 107, and outputs the read address to a motion search unit 109b and a motion compensating unit 109d together with a time stamp corresponding to a current time. Further, the playing control unit 109a includes an input video time counter consisted of an integer part time counter representing a frame number on a video and a decimal part time counter representing a period of time less than a frame interval of the video. The input video time counter is controlled such that a value obtained by multiplying a playing speed by a value obtained by dividing the first frame rate by the second frame rate is added for each output frame in the case of displaying the video input of the first frame rate at the second frame rate. When a scene change from a first scene to a second scene is detected and the value of the input video time counter is positioned between a frame at the end of the first scene and a frame at the head of the second scene directly after the first scene, the playing control unit 109a resets the value of the integer part time counter to a value representing the frame at the head of the second scene and resets the value of the decimal part time counter to 0.

The motion search unit 109b reads a criterion image and an immediately preceding reference image from the frame memory 107, and performs a motion search of obtaining optimal motion vectors by block matching. The motion search unit 109b obtains a motion vector pointing to the reference image from each pixel of the criterion image, and stores results corresponding to one frame of the criterion image in a motion vector storage unit 109c. The playing control unit 109a and the motion search unit 109b configure a video input unit.

The motion vector storage unit 109c has the capacity capable of storing motion vectors of two frames, and has a double buffer configuration in which a use of an area alternates every frame. In other words, of the whole capacity, a capacity corresponding to one frame is used as a writing destination of the motion search unit 109b, and a capacity corresponding to the other frame is used as a reading source of the motion compensating unit 109d.

The motion compensating unit 109d reads the motion vector from the motion vector storage unit 109c, reads the criterion image and the reference image used for the motion search from the frame memory 107, and generates an interpolated image. Further, when an interpolated image need not be generated, the motion compensating unit 109d outputs any one of the images as is. The motion search unit 109b, the motion vector storage unit 109c, and the motion compensating unit 109d configure an interpolated image generating unit.

The scene change detecting unit 109e receives evaluation costs at the time of block matching corresponding to motion search results. Further, when processing on the criterion image of one frame ends, the motion search unit 109b outputs a scene change detection flag having a value of "1" to the playing control unit 109a when a scene change is detected between the criterion image and the reference image, but outputs a scene change detection flag having a value of "0" to the playing control unit 109a when no scene change is detected between the criterion image and the reference image. The motion search unit 109b, the scene change detecting unit 109e and the playing control unit 109a configure a video playing unit.

Figure 3:
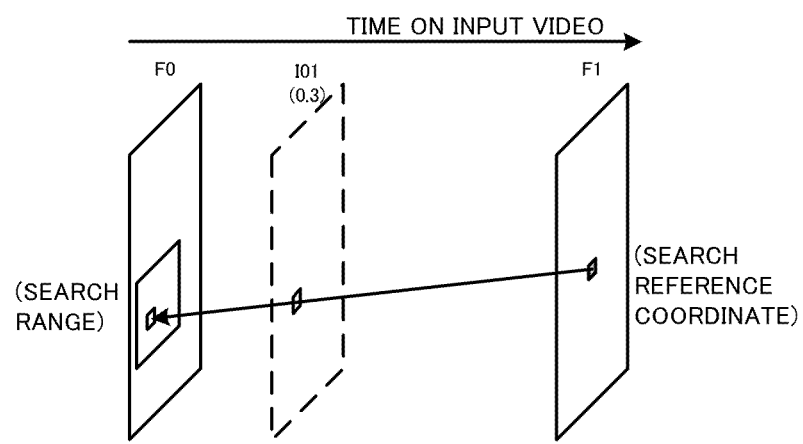
FIG. 3 is a diagram for describing processing of a motion search unit.

FIG. 3 is a diagram for describing processing of the motion search unit 109b illustrated in FIG. 2. A frame F1 represents a criterion image, and a frame F0 represents a reference image. Further, I01(0.3) represents an interpolated frame generated using a motion search result. A numerical part "01" represents "being between F0 and F1." Further, a numerical part "0.3" represents "positioning at a time of 0.3" considering a time interval between F0 and F1 is to be 1.

The motion search process is performed on a certain area of the frame F1, for example, each of blocks obtained by dividing the frame F1 in units of 8×8 pixels. At this time, a motion vector of an image closest to a block of interest within a certain range such as 64×64 pixels centering on a block on the frame F0 which is at the same position as the block of interest is obtained. For example, a sum of absolute differences or a sum of squared differences between images may be used as an evaluation cost value. Further, for 8×8 pixels at the position obtained by scaling the obtained motion vector by (1−0.3)=0.7, on the frame I01(0.3), a value of 0.3 times the motion vector is assigned to the frame F0 side, and a value of −0.7 times the motion vector is assigned to the frame F1 side. This process is performed on all blocks of the frame F1, and the motion vectors of one frame corresponding to I01(0.3) are stored in the motion vector storage unit 109c. In this process, there may occur an area in which motion vectors from different blocks on the frame F1 collide with each other on the frame I01(0.3) or an area in which no motion vector is assigned on the frame I01(0.3). When the motion vectors collide with each other, a motion vector having a smaller evaluation cost value remains, and when there is an area in which no motion vector is allocated, pixels are filled, for example, by a method of copying from surrounding pixels on the frame I01(0.3).

Next, a slow motion playing process performed in the moving image player device 100 when no scene change is detected will be described with reference to FIGS. 4 to 6.

Figure 4:
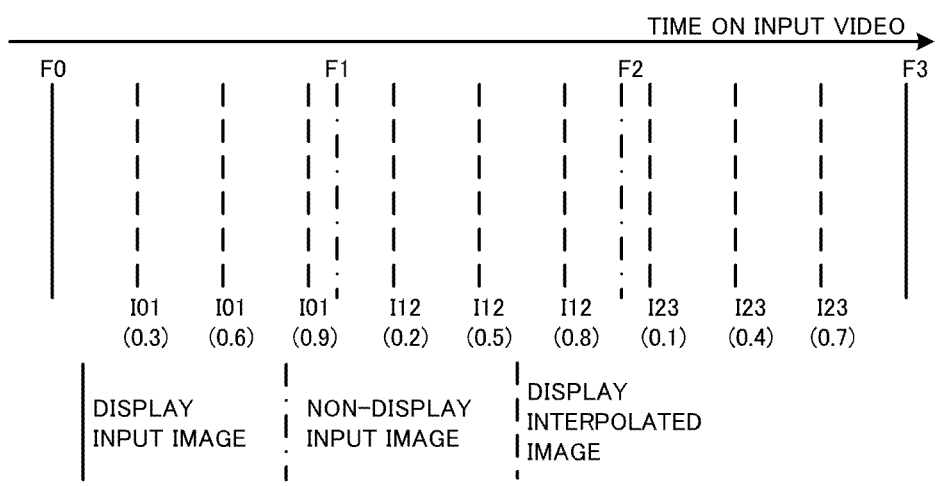
FIG. 4 is a diagram illustrating a time-series positional relation of an image displayed when the moving image player device according to the first embodiment detects no scene change at the time of 0.3× speed playing.

FIG. 4 is a diagram illustrating a time-series positional relation of an image displayed when the moving image player device 100 according to the present embodiment detects no scene change at the time of 0.3× speed playing. When 0.3× speed playing is performed starting from the frame F0, the moving image player device 100 generates and output interpolated images at time intervals of 0.3 frames (frames I01(0.3), I01(0.6), and the like). Further, when a time corresponding to an integer frame position comes, an input image is output without any change (a frame F3).

Figure 5:
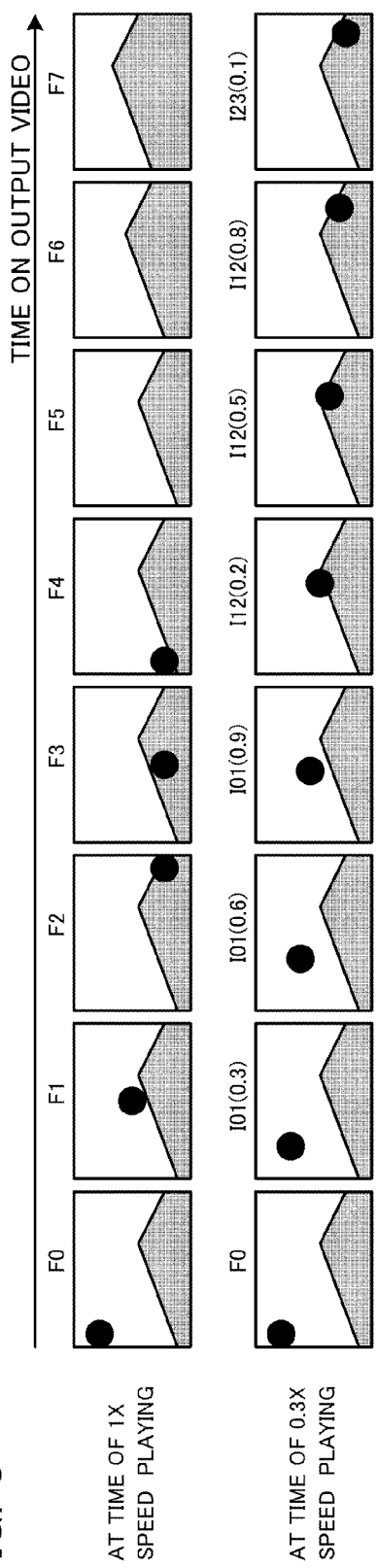
FIG. 5 is a diagram illustrating exemplary corresponding output images when 0.3× speed playing is performed.

FIG. 5 is a diagram illustrating exemplary corresponding output images when 0.3× speed playing is performed. FIG. 6 is a diagram illustrating a time-series change in the content of the frame memory 107, a processing target frame of the motion search unit 109b, a scene change detection result of the scene change detecting unit 109e, a processing target frame of the motion compensating unit 109d, and an output image at the time of 0.3× speed playing.

Figure 6:
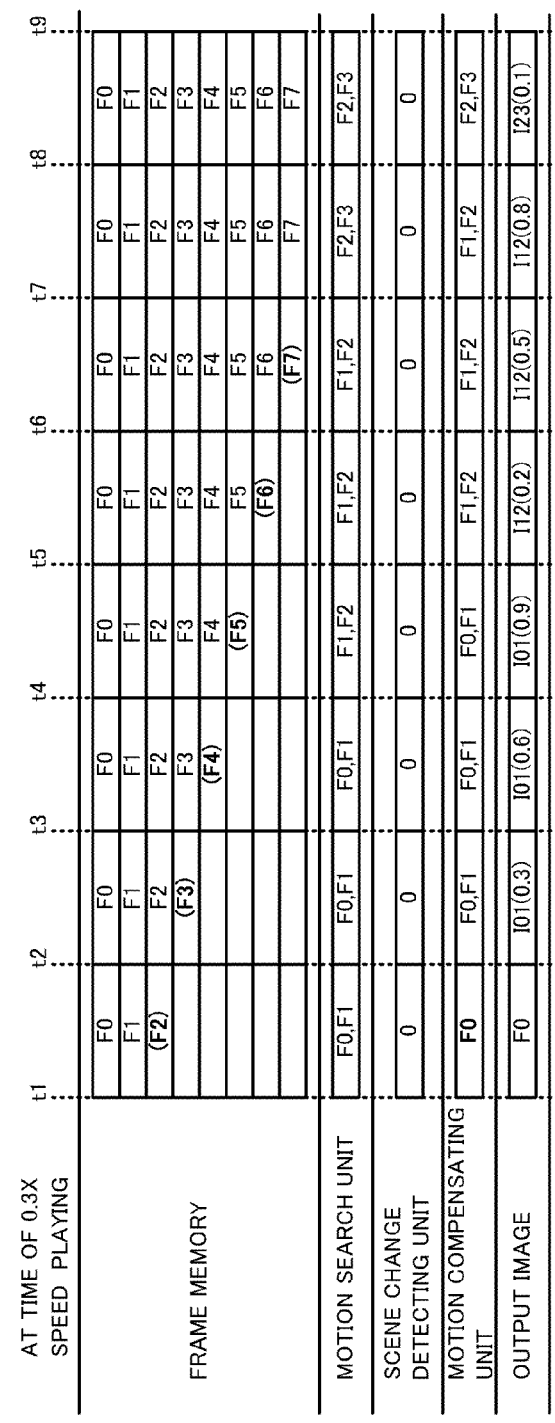
FIG. 6 is a diagram illustrating a time-series change in the content of a frame memory, a processing target frame of a motion search unit, a scene change detection result of a scene change detecting unit, a processing target frame of a motion compensating unit, and an output image at the time of 0.3× speed playing.

Referring to FIG. 6, the frame memory 107 has the capacity of at least 8 frames for use in the playing processing unit 109, and a frame ID shown in parentheses "( )" indicates that the image correcting unit 108 is processing and outputting the corresponding frame. Further, blank areas represent that the content is empty or not completed yet. At a time t7, an output of a frame F7 from the image correcting unit 108 is completed, and the frame memory 107 has no blank area. At this time, the general control unit 101 stops output of the image correcting unit 108, and prevents the frame memory 107 from being overwritten. Further, an area used by the MPEG decoder unit 106 exists separately from the illustrated area.

Further, frames listed in the row of the motion search unit represent inputs of the motion search unit 109b. For example, "F0, F1" represents that the frame F0 is searched based on the frame F1. Values stated in the row of the scene change detecting unit represent outputs of the scene change detecting unit 109e. The scene change detecting unit 109e receives the search result, and updates and outputs a scene change detection result related to the corresponding search result when the motion search unit 109b ends the search process corresponding to one frame. For example, at a time t2, the scene change detecting unit 109e updates and outputs the scene change detection result when the motion search is performed on the frames F0 and F1 between the times t1 and t2. Further, when the motion search unit 109b does not operate, a previous output value is held without updating the scene change detection result.

Frames stated in the row of the motion compensating unit represent inputs of the motion compensating unit 109d. For example, "F0, F1" represents that the search result for the frames F0 and F1 stored in the motion vector storage unit 109c is read, and an interpolated image is generated by motion compensation using the read frames. The generated output image is, for example, I01(0.3).

Next, an operation of the moving image player device 100 according to the present embodiment when a scene change is detected between the frames F1 and F2 at the time of slow motion playing will be described with reference to FIGS. 7 to 10. In the first embodiment, frame interpolation is skipped when there is a scene change.

Figure 7:
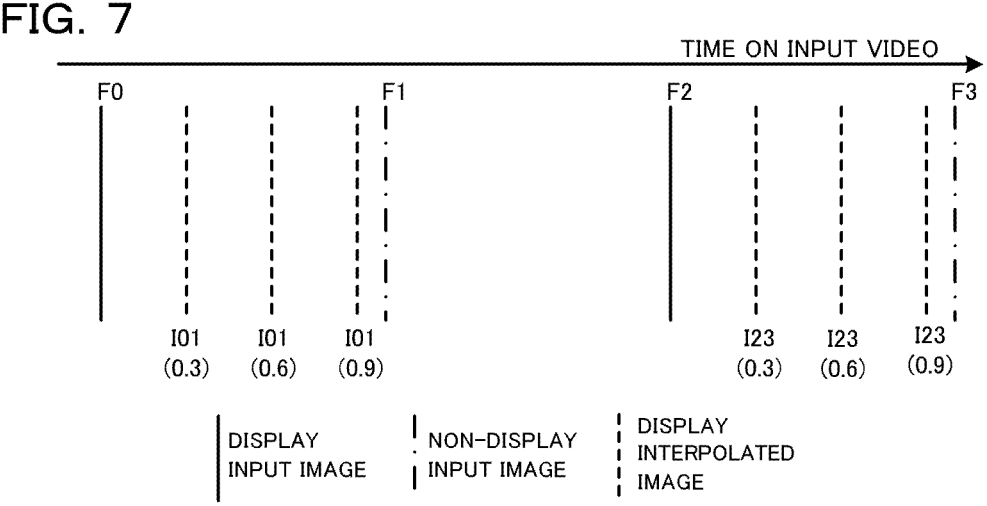
FIG. 7 is a diagram illustrating a time-series positional relation of an image output when the moving image player device according to the first embodiment detects a scene change at the time of 0.3× speed playing.

FIG. 7 is a diagram illustrating a time-series positional relation of an image output when the moving image player device 100 according to the first embodiment detects a scene change at the time of 0.3× speed playing. As illustrated in FIG. 7, interpolated frames between the frames F1 and F2 between which a scene change is detected are not generated; transition to the frame F2 is performed. Through this operation, a smooth display is maintained even when a scene change is made.

Figure 8:
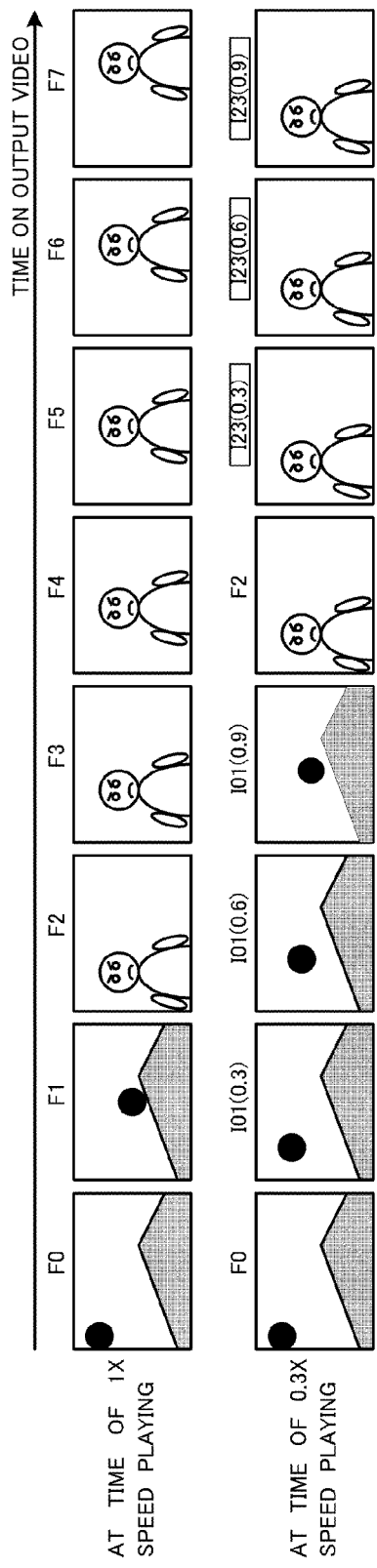
FIG. 8 is a diagram illustrating an exemplary output image corresponding to FIG. 7.

FIG. 8 is a diagram illustrating an exemplary output image corresponding to FIG. 7. When 0.3× speed playing is performed, following an interpolated frame I01(0.9), the frame F2 is displayed, and then interpolated frames I23(0.3), I23(0.6), and I23(0.9) are displayed in order.

Figure 9:
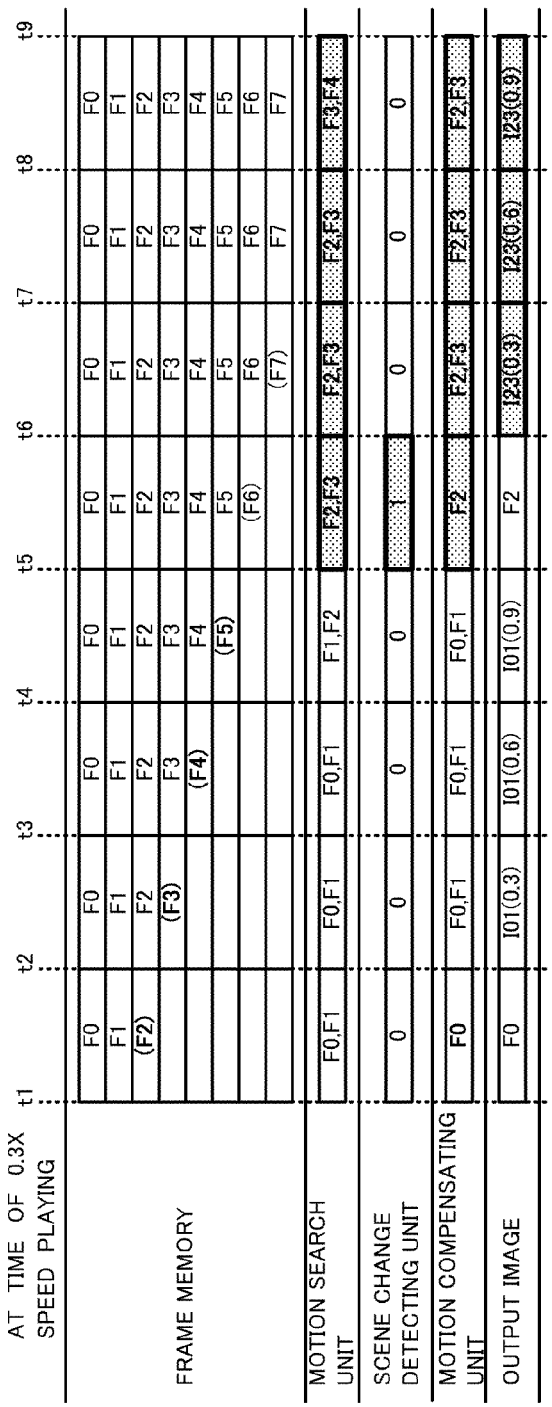
FIG. 9 is a diagram illustrating a time-series change in the content of a frame memory, a processing target frame of a motion search unit, a scene change detection result of a scene change detecting unit, a processing target frame of a motion compensating unit, and an output image at the time of 0.3× speed playing.

FIG. 9 is a diagram illustrating a time-series change in the content of the frame memory 107, the processing target frame of the motion search unit 109b, the scene change detection result of the scene change detecting unit 109e, the processing target frame of the motion compensating unit 109d, and the output image at the time of 0.3× speed playing. The scene change detection result based on the motion search result for the frames F1 and F2 becomes 1 at a time t5, then the motion search for the frames F2 and F3 is performed between the times t5 and t6, and thereafter a process of generating and outputting an interpolated frames between the frames F2 and F3 is performed between times t6 and t9.

Figure 10:
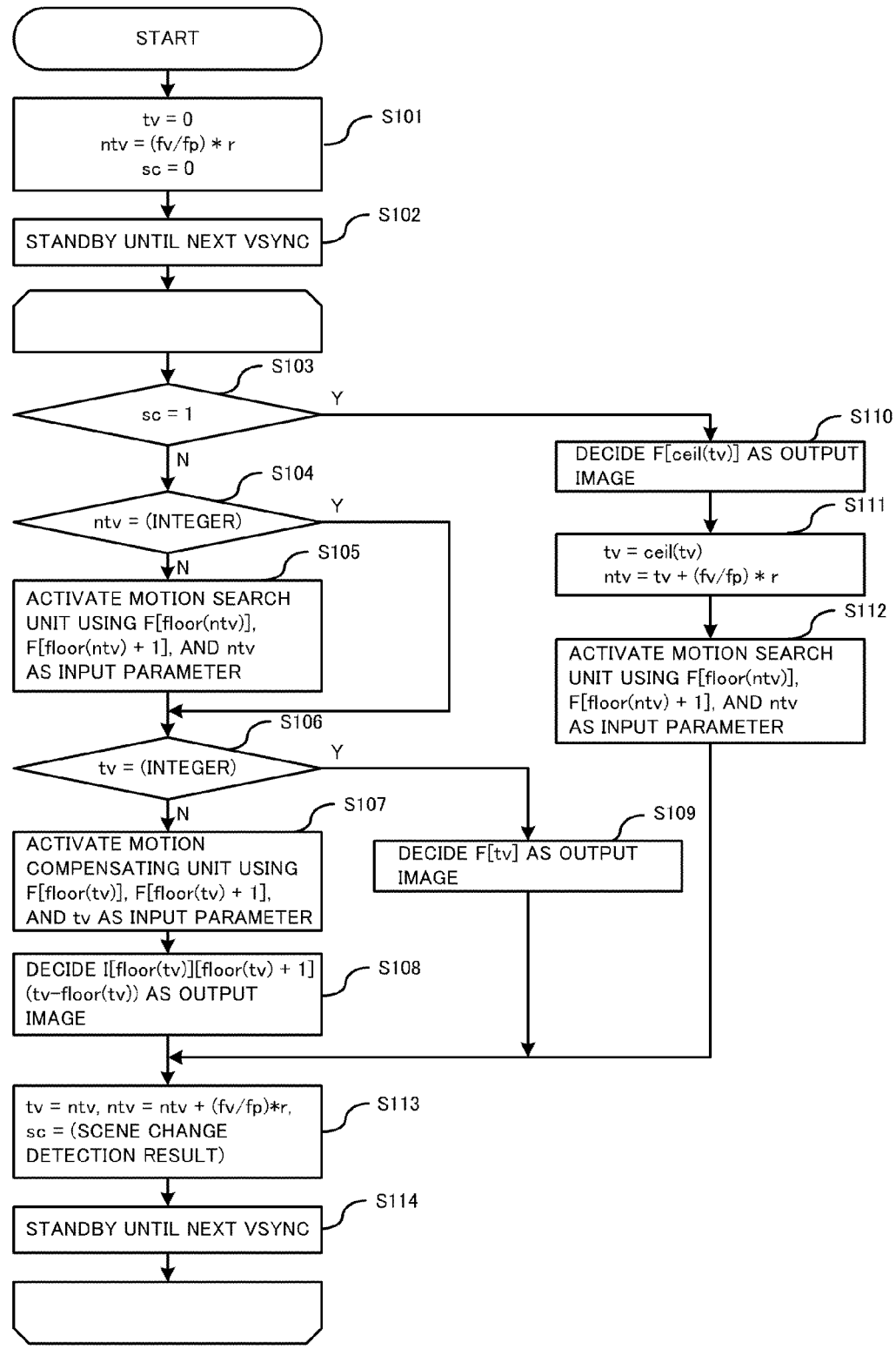
FIG. 10 is a flowchart illustrating exemplary processing of a playing control unit according to the first embodiment.

FIG. 10 is a flowchart illustrating exemplary processing of the playing control unit 109a according to the present embodiment.

The playing control unit 109a initializes a variable tv representing a time counter for the motion compensating unit 109d, a variable ntv representing a time counter for the motion search unit 109b, and a variable sc serving as the scene change detection flag (S101).

[Memory initialization]:tv=0,ntv=(fv/fp)*r,sc=0

A variable fv represents a frame rate [fps] of a decoded image, and a variable fp represents a display frame rate [fps] of the LCD panel unit 111.

Then, the playing control unit 109a determines whether the scene change detection flag sc is 1, that is, whether a scene change has been detected (S103).

When no scene change has been detected (No in S103), the playing control unit 109a determines whether the time counter ntv is an integer value (S104). When the time counter ntv is not an integer value (No in S104), the playing control unit 109a activates the motion search unit 109b using F[floor(ntv)], F[floor(ntv)+1], and ntv as input parameters (S105). Here, a floor(x) represents a value obtained by rounding a value of x down to the nearest integer value. Further, a parameter in [ ] represents a frame number such as F0 or F1.

Meanwhile, when the time counter ntv is an integer value (Yes in S104), the process continues to S106. The playing control unit 109a determines whether the time counter tv is an integer value (S106). When the time counter tv is not an integer value (No in S106), the playing control unit 109a activates the motion compensating unit 109d using F[floor (tv)], F[floor(tv)+1], and tv as input parameters (S107).

Then, the playing control unit 109a decides a processing result I[floor (tv)] [floor (tv)+1] (tv−floor(tv)) from the motion compensating unit 109d as an output image (S108), and then the process proceeds to S113.

Meanwhile, when the time counter tv is an integer value (Yes in S106), the playing control unit 109a decides F[tv] as an output image (S109), and then the process advances to S113.

When a scene change is detected (Yes in S103), the playing control unit 109a decides F[ceil(tv)] as an output image (S110). Here, ceil(x) represents a value obtained by rounding a value of x up to the nearest integer value.

Then, the playing control unit 109a updates values of the time counter tv and the time counter ntv (S111).

[Memory update]:$tv=\text{ceil}(tv), ntv=tv+(fv/fp)*r$

Then, the playing control unit 109a activates the motion search unit 109b using F[floor(ntv)], F[floor(ntv)+1], and ntv as input parameters (S112).

When the presence or absence of a scene change is determined and an output image is decided, the playing control unit 109a updates values of the time counter tv, the time counter ntv, and the scene change detection flag sc (S113).

[Memory update]:$tv=ntv, ntv=ntv+(fv/fp)*r, sc=$(scene change detection result)

Then, the playing control unit 109a is on standby until next VSYNC (S114), and then process returns to S103. The playing control unit 109a repeats the process of S103 to S114 until an instruction to stop slow motion playing is given.

The difference with processing according to the related art lies in processing when a scene change is detected. When a scene change is detected, the variable tv is rounded up to an integer. Thus, it is possible to skip generation of an interpolated frame positioned between before and after the scene change and make transition to a display of the next frame F2. At the same time, by using a value obtained by adding a time until a next display frame to the variable tv obtained by rounding up to an integer as the variable ntv, it is possible to start the motion search process for the next interpolated frame.

Further, the playing control unit 109a controls the time counter ntv such that (fv/fp)*r is sequentially added for each frame of output image when fv is the frame rate of the decoded image, fp is the display frame rate of the LCD panel unit 111, and r is the playing speed. As a result, the playing processing unit 109 can perform playing at an arbitrary playing speed including r=1 together with the FRC process of the related art.

As described above, in the present embodiment, when a scene change is detected, control is performed such that a display of an interpolated frame corresponding to a time between frames before and after the scene change is skipped, and transition to a display of the subsequent scene is made. Thus, a phenomenon that at a timing of a scene change, a distorted image is displayed or a stop seems to be unnaturally made since the same frame is output several times is prevented, and smooth slow playing can be maintained even before and after a scene change.

Further, control is performed such that the time counter ntv is rounded up to an integer value when there is a scene change. Thus, it is possible to implement control such that transition to a display of the subsequent scene is immediately made based on the value of the time counter ntv when a scene change occurs.

Modified Example of First Embodiment

The example in which the playing speed r is 0.3 has been described with reference to FIGS. 7 to 9. In FIGS. 7 to 9, before and after a scene change, the last frame of the preceding scene is not displayed, and transition to a display of a first frame of the subsequent scene is made.

Meanwhile, FIGS. 11 to 19 are diagrams illustrating a time-series positional relation of an image output when a scene change is detected at the time of 0.25× speed playing.

Figure 11:
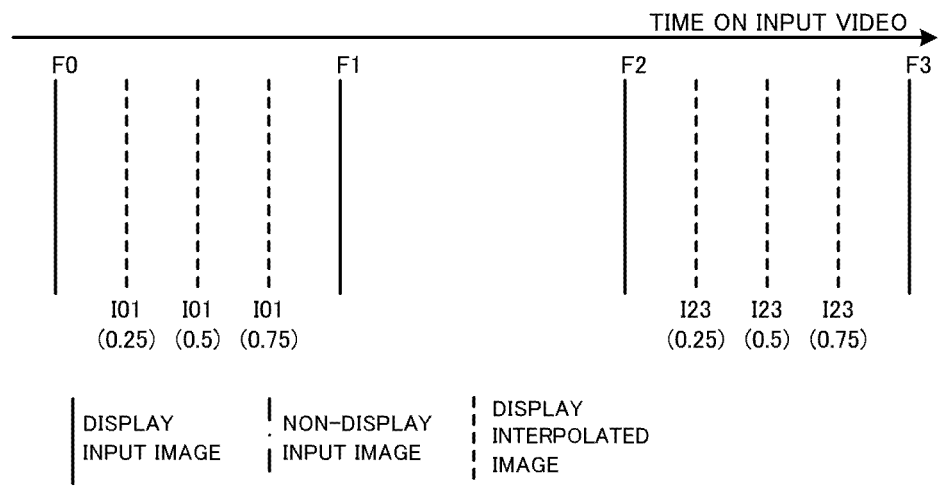
FIG. 11 is a diagram illustrating a pattern (1) of a time-series positional relation of an image output when the moving image player device according to the first embodiment detects a scene change at the time of 0.25× speed playing.

In FIG. 11, a frame F0 that adjacent immediately before a frame F1 at the end of the preceding scene, interpolated frames I01(0.25), I01(0.5), and I01(0.75) that are generated using the frame F1 and the frame F0 that is adjacent immediately before the frame F1, the frame F1, a frame F2 at the head of the subsequent scene, interpolated frames I23(0.25), I23(0.5), and I23(0.75) that are generated using the frame F2 and a frame F3 that is adjacent immediately after the frame F2, and the frame F3 that is adjacent immediately after the frame F2 are displayed in time series (display pattern 1).

Figure 12:
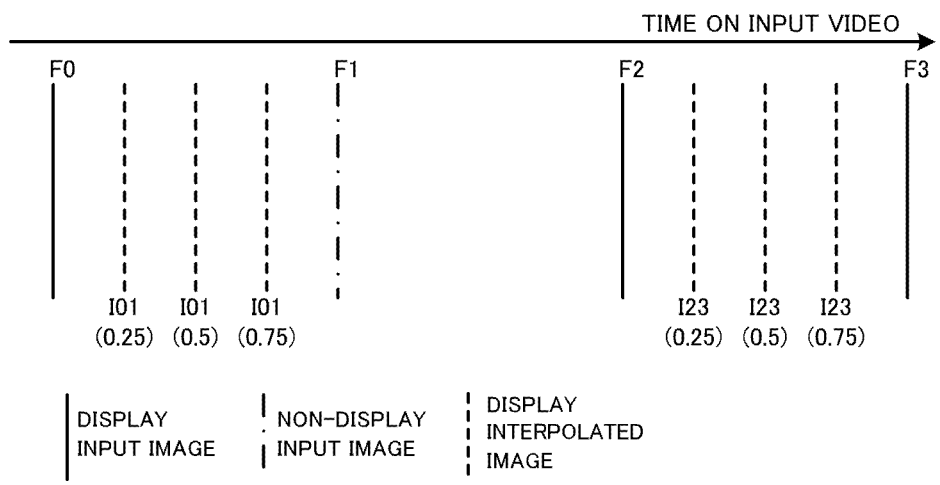
FIG. 12 is a diagram illustrating a pattern (2) of a time-series positional relation of an image output when the moving image player device according to the first embodiment detects a scene change at the time of 0.25× speed playing.

In FIG. 12, a frame F0, interpolated frames I01(0.25), I01(0.5), and I01(0.75), a frame F2, interpolated frames I23(0.25), I23(0.5), and I23(0.75), and a frame F3 are displayed in time series (display pattern 2). The difference with the display pattern 1 lies in that the frame F1 is not displayed.

Figure 13:
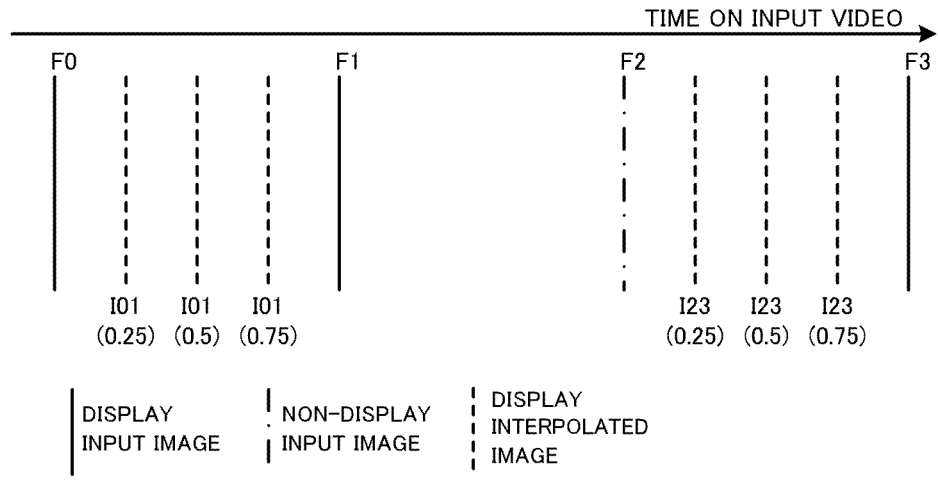
FIG. 13 is a diagram illustrating a pattern (3) of a time-series positional relation of an image output when the moving image player device according to the first embodiment detects a scene change at the time of 0.25× speed playing.

In FIG. 13, a frame F0, interpolated frames I01(0.25), I01(0.5), and I01(0.75), a frame F1, interpolated frames I23(0.25), I23(0.5), and I23(0.75), and a frame F3 are displayed in time series (display pattern 3). The difference with the display pattern 2 lies in that the frame F1 is displayed, but the frame F2 is not displayed.

Figure 14:
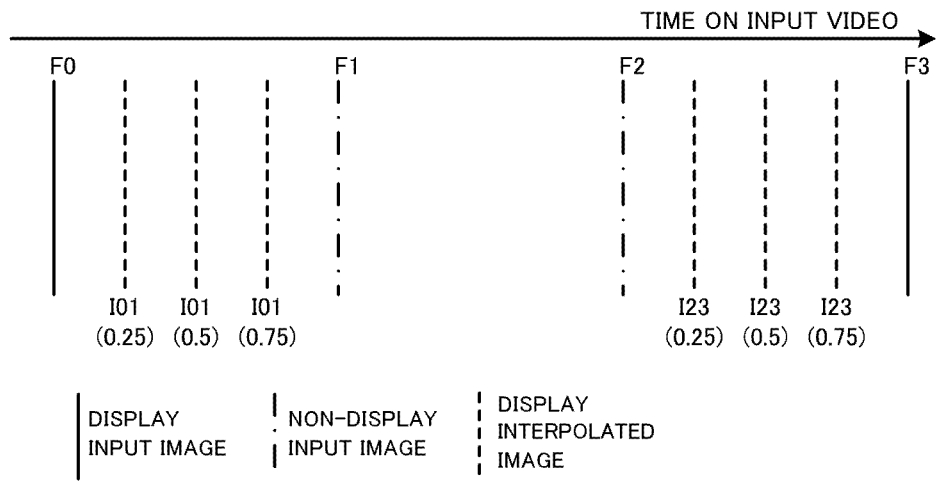
FIG. 14 is a diagram illustrating a pattern (4) of a time-series positional relation of an image output when the moving image player device according to the first embodiment detects a scene change at the time of 0.25× speed playing.

In FIG. 14, a frame F0, interpolated frames I01(0.25), I01(0.5), and I01(0.75), interpolated frames I23(0.25), I23(0.5), and I23(0.75), and a frame F3 are displayed in time series (display pattern 4). The difference with the display pattern 1 lies in that the frame F1 and the frame F2 are not displayed.

Figure 15:
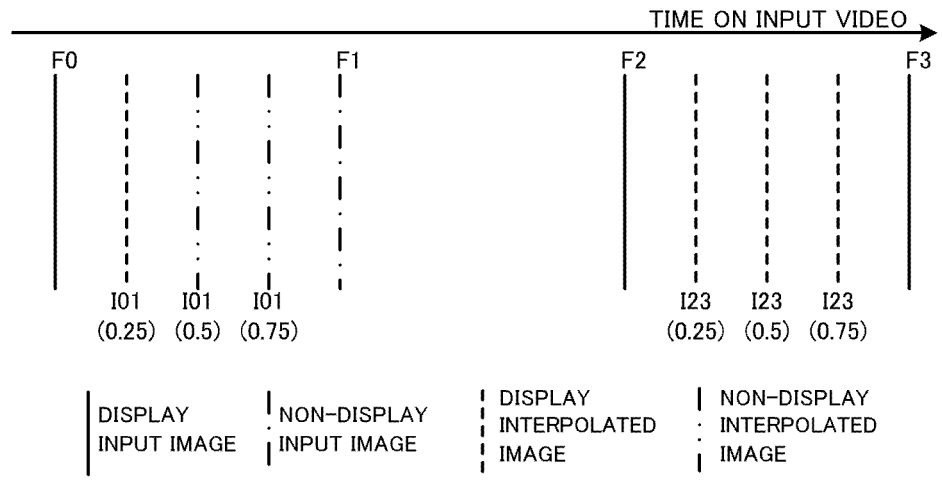
FIG. 15 is a diagram illustrating a pattern (5) of a time-series positional relation of an image output when the moving image player device according to the first embodiment detects a scene change at the time of 0.25× speed playing.

In FIG. 15, a frame F0, an interpolated frame I01(0.25), a frame F2, interpolated frames I23(0.25), I23(0.5), and I23(0.75) that are larger in number than the interpolated frame I01, and a frame F3 are displayed in time series (display pattern 5). The difference with the display pattern 2 lies in the number of the displayed interpolated frames I01.

Figure 16:
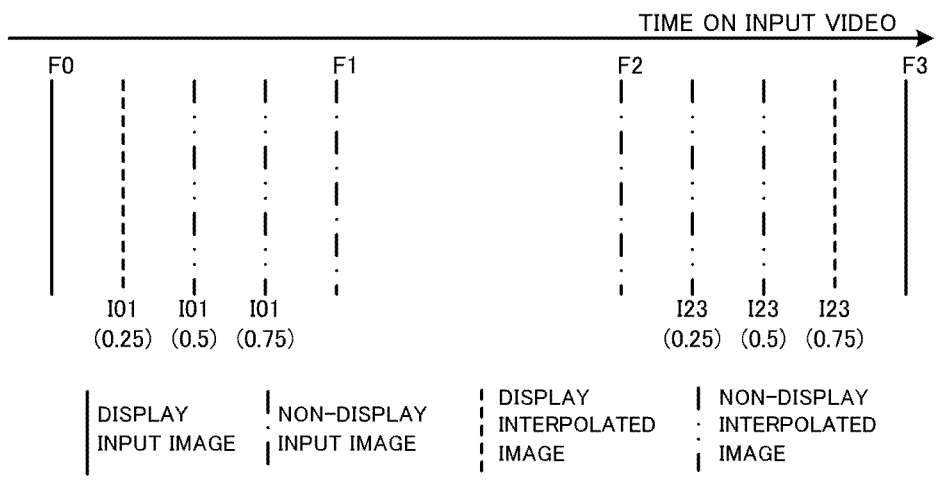
FIG. 16 is a diagram illustrating a pattern (6) of a time-series positional relation of an image output when the moving image player device according to the first embodiment detects a scene change at the time of 0.25× speed playing.

In FIG. 16, a frame F0, interpolated frame I01(0.25), an interpolated frame I23(0.75), and a frame F3 are displayed in time series (display pattern 6). The difference with the display pattern 4 lies in the number of the displayed interpolated frames I01 and the number of displayed interpolated frames I23.

Figure 17:
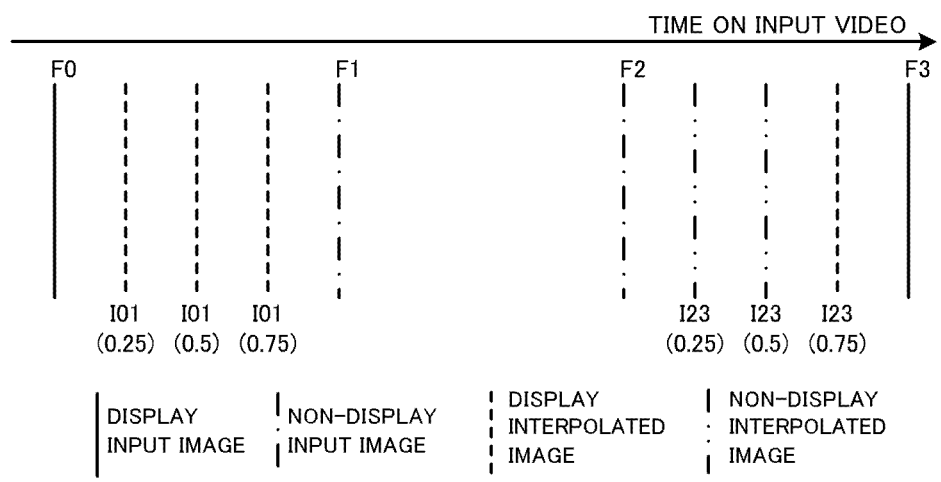
FIG. 17 is a diagram illustrating a pattern (7) of a time-series positional relation of an image output when the moving image player device according to the first embodiment detects a scene change at the time of 0.25× speed playing.

In FIG. 17, a frame F0, interpolated frames I01(0.25), I01(0.5), and I01(0.75), an interpolated frame I23(0.75) that is smaller in number than the interpolated frame I01, and a frame F3 are displayed in time series (display pattern 7). The difference with the display pattern 4 lines in the number of the displayed interpolated frames I23.

Figure 18:
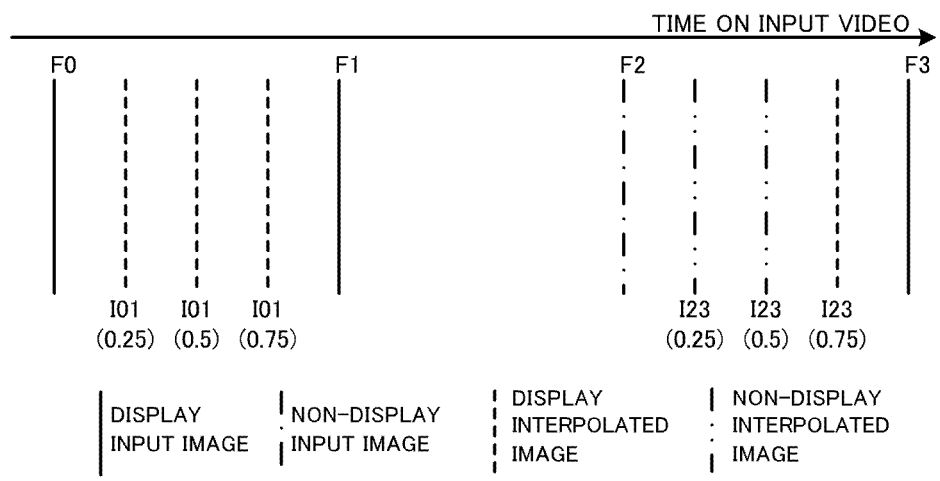
FIG. 18 is a diagram illustrating a pattern (8) of a time-series positional relation of an image output when the moving image player device according to the first embodiment detects a scene change at the time of 0.25× speed playing.

In FIG. 18, a frame F0, interpolated frames I01(0.25), I01(0.5), and I01(0.75), a frame F1, an interpolated frame I23(0.75) that is smaller in number than the interpolated frame I01, and a frame F3 are displayed in time series (display pattern 8). The difference with the display pattern 3 lies in the number of the displayed interpolated frames I23.

Figure 19:
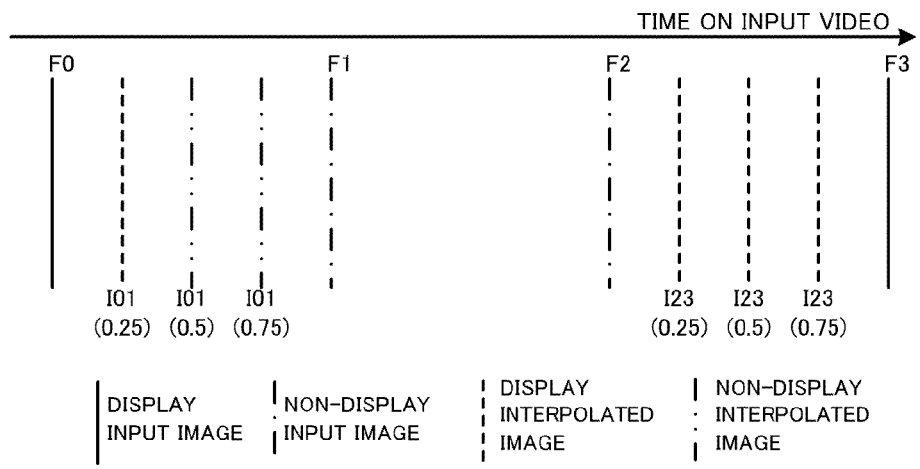
FIG. 19 is a diagram illustrating a pattern (9) of a time-series positional relation of an image output when the moving image player device according to the first embodiment detects a scene change at the time of 0.25× speed playing.

In FIG. 19, a frame F0, an interpolated frame I01(0.25), interpolated frames I23(0.25), I23(0.5), and I23(0.75) that are larger in number than the interpolated frame I01, and a frame F3 are displayed in time series (display pattern 9). The difference with the display pattern 5 lies in that the frame F2 is not displayed.

As described above, in the display patterns of the respective drawings, control is performed such that the last frame F1 of the preceding scene or the first frame F2 of the subsequent scene is displayed or not displayed. Since smooth playing is maintained before and after a scene change in all the above-mentioned cases, the playing control unit 109a may be configured to perform the above-mentioned displays.

Figure 20:
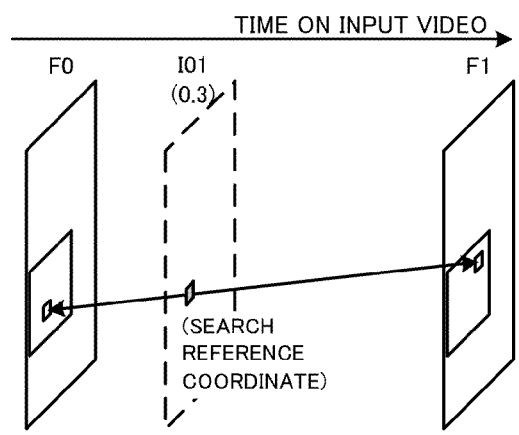
FIG. 20 is a diagram for describing another processing method of a motion search unit illustrated in FIG. 2.

Further, the motion search process of the playing control unit 109a may be performed such that a point symmetric search is performed on an area on an interpolated frame, for example, each of blocks obtained by dividing the interpolated frame in units of 8×8 pixels as illustrated in FIG. 20 instead of a method in which a search is sequentially performed on a certain area of the frame F1. In other words, it is a method in which images that are point-symmetrically positioned centering on a frame I01(0.3) within a certain range on a frame F0 that is at the same position as a block of interest on the frame F0 are set as an evaluation target, and a motion vector of the closest image is a motion vector of the block of interest.

Second Embodiment

A second embodiment will be described with some examples where frames to be displayed are extrapolated when a scene change is detected, using frames before the scene change, frames after the scene change, or frames before and after the scene change.

In the second embodiment, interpolated image generating unit in the first embodiment is called extra- or inter-polated image generating unit because it generates extrapolated image as well as interpolated image, but its configuration and function are equivalent to the one in the first embodiment. Only its parameters passed from playing control unit 109a is different.

Figure 21:
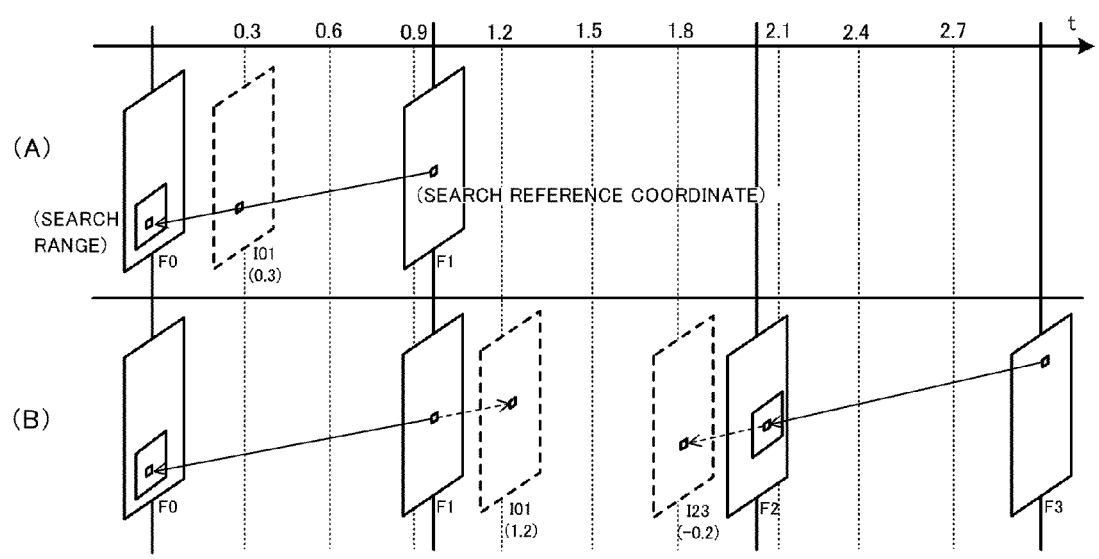
FIGS. 21A and 21B are diagrams for describing an interpolated frame generating method of a playing processing unit according to a second embodiment.

FIGS. 21A and 21B are diagrams for describing inter- and extra-polation frames generating method of a playing processing unit 109 according to the second embodiment. FIG. 21A is a diagram for describing interpolation of a frame when a scene change is not detected. Here, an interpolated frame I01(0.3) is inserted between frames F0 and F1. On the other hand, FIG. 21B is a diagram for describing extrapolation of frames when a scene change is detected. There is a scene change between frames F1 and F2. In the first embodiment, either extra- or inter-polated frames are not generated in this frame section. However, in the second embodiment, extrapolated frames are generated from frames before and/or after a scene change. I01(1.2) is generated based on the frames F0 and F1 and inserted between F1 and F2. I23(−0.2) is generated based on the frames F2 and F3 and inserted between F1 and F2.

Figure 22:
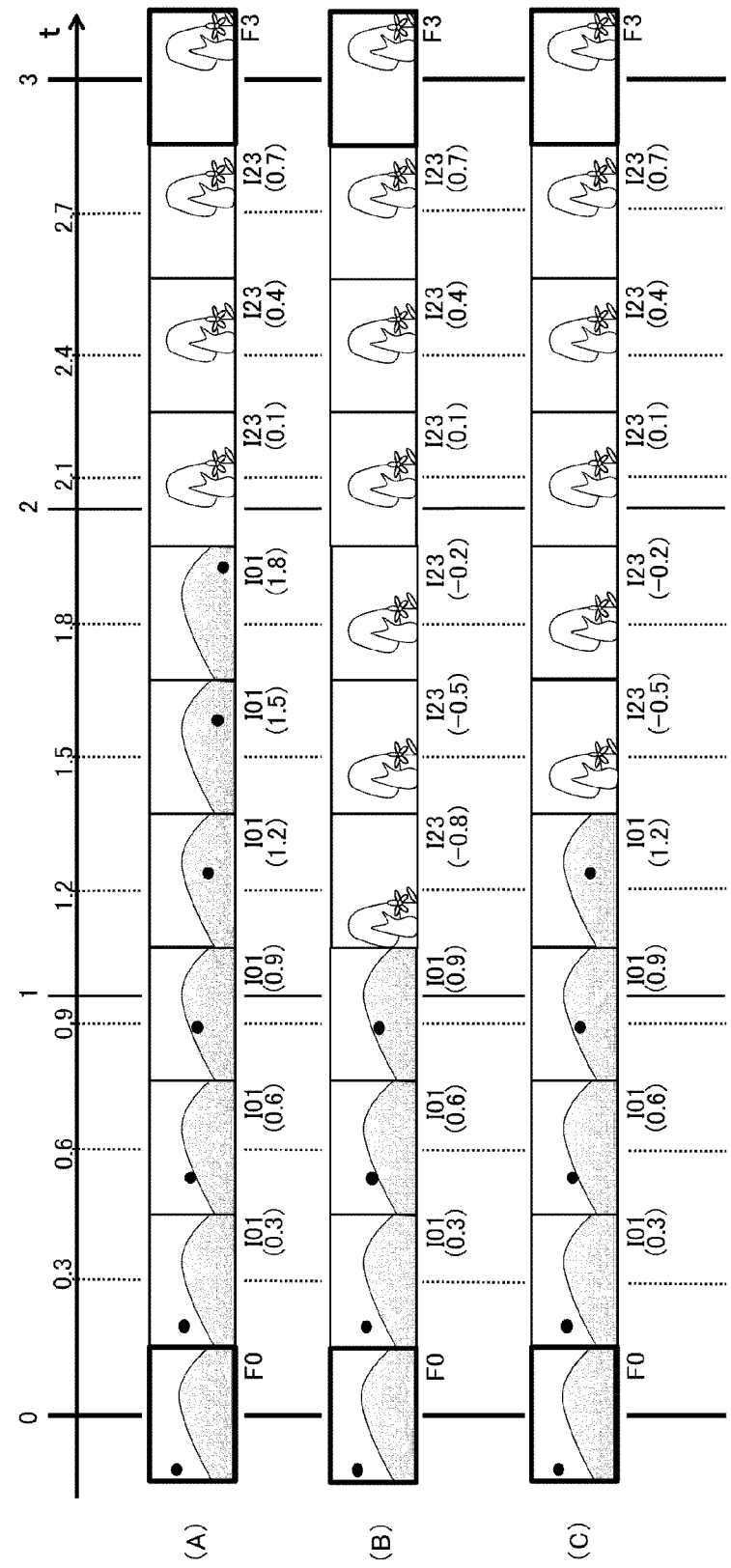
FIGS. 22A to 22C are diagrams illustrating exemplary output images when a playing processing unit according to the second embodiment detects a scene change.

FIGS. 22A to 22C are diagrams illustrating an exemplary output image when the playing processing unit 109 according to the second embodiment detects a scene change. Similarly to 21B, there is a scene change between the frames F1 and F2. When 0.3× playing is performed, in case of FIG. 22A, extrapolated frames I01(1.2), I01(1.5), and I01(1.8) generated from the frames F0 and F1 before the scene change are displayed subsequently to an interpolated frame I01(0.9).

In case of FIG. 22B, extrapolated frames I23(−0.8), I23(−0.5), and I23(−0.2) generated from the frames F2 and F3 after the scene change are displayed subsequently to an interpolated frame I01(0.9). In case of FIG. 22C, an extrapolated frame I01(1.2) generated from the frames F0 and F1 before scene change is displayed subsequently to an interpolated frame I01(0.9), and extrapolated frames I23(−0.5) and I23(−0.2) generated from the frames F2 and F3 after the scene change are displayed subsequently to I01(1.2). In all cases of FIGS. 22A to 22C, a smooth display can be maintained when there is a scene change.

Figure 23:
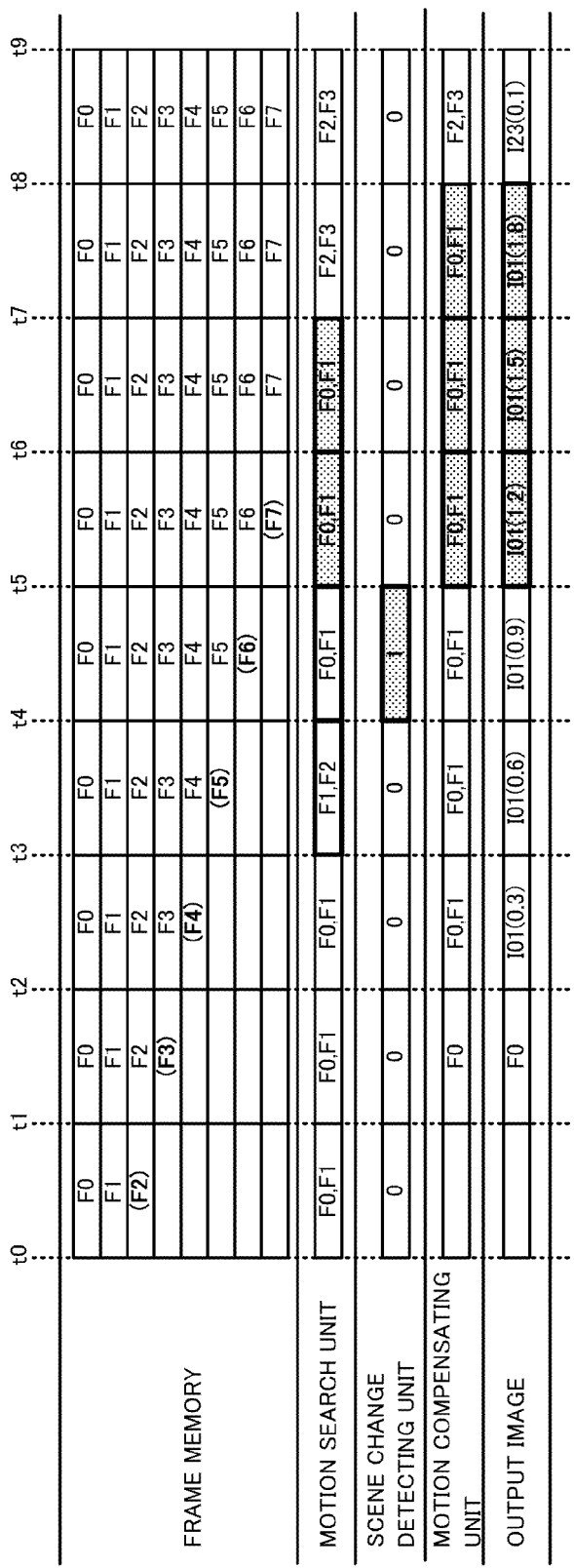
FIG. 23 is a diagram illustrating a time-series change in the content of a frame memory, a processing target frame of a motion search unit, a scene change detection result of a scene change detecting unit, a processing target frame of a motion compensating unit, and an output image in case of FIG. 22B.

FIG. 23 is a diagram illustrating a time-series change in the content of the frame memory 107, the processing target frame of the motion search unit 109b, the result of the scene change detecting unit 109e, the processing target frame of the motion compensating unit 109d, and the output image in case of FIG. 22B. The motion search is performed in advance, and when a scene change is detected, extrapolated frames are generated afterwards from the frames before the scene change.

Figure 24:
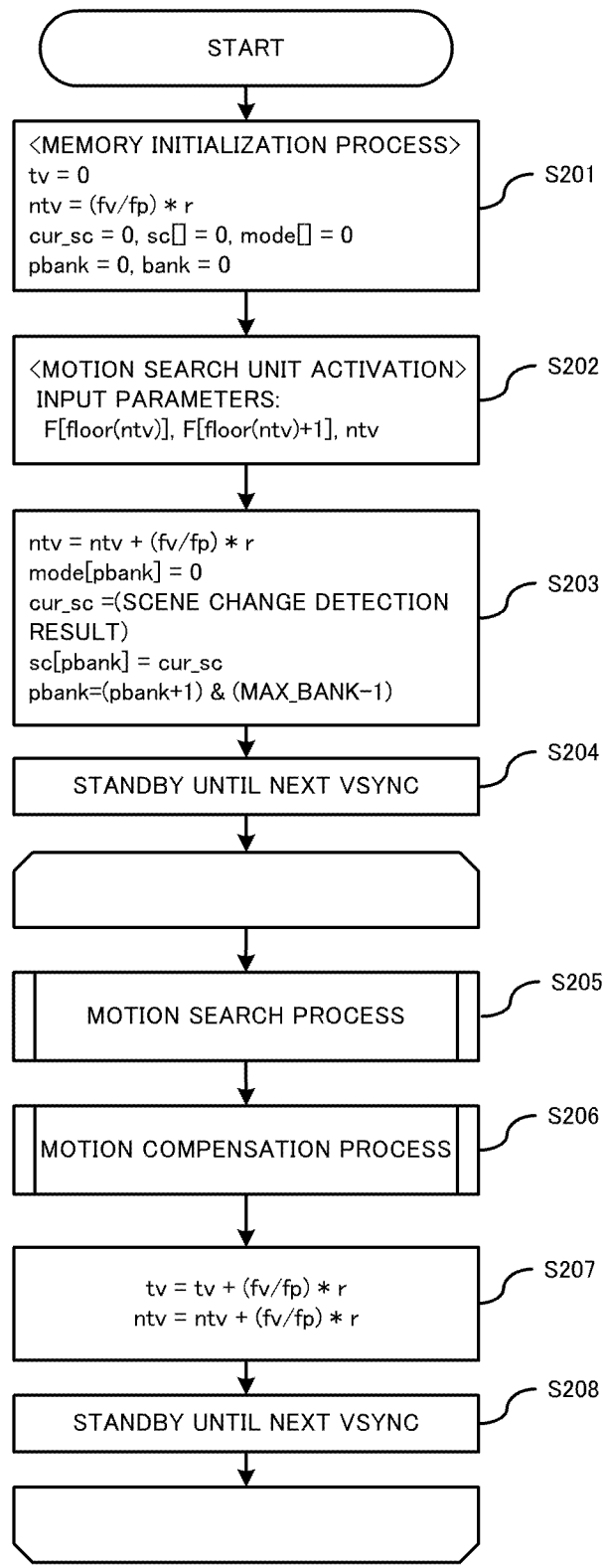
FIG. 24 is a flowchart illustrating exemplary processing of a playing control unit according to the second embodiment.

FIG. 24 is a flowchart illustrating exemplary processing of the playing control unit 109a according to the present embodiment.

The playing control unit 109a initializes the variables stored in the memory (S201).

[Memory initialization]:$tv=0, ntv=(fv/fp)*r, cur\_sc=0,$
  $sc[\ ]=0, mode[\ ]=0, pbank=0, bank=0$ The variable tv is a time counter for the motion compensating unit 109d, and the variable ntv is a time counter for the motion search unit 109b. The variable fv represents a frame rate [fps] of a decoded image, and the variable fp represents a display frame rate [fps] of the LCD panel unit 111. The variable cur_sc is a scene change detection flag when a motion search is performed. sc[MAX_BANK] and mode[MAX_BANK] represent a held scene change detection flag and a mode of a motion search. MAX_BANK represents the number of frames of motion vectors that can be stored in the motion vector storage unit 109c. The variable pbank represents a position at which information is written at the time of a motion search, and the variable bank represents a position at which information is read at the time of motion compensation.

Then, the playing control unit 109a activates the motion search unit 109b using F[floor(ntv)], F[floor(ntv)+1], and ntv as input parameters (S202).

Then, the playing control unit 109a updates values of the time counter ntv, mode[pbank], the scene change detection flag cur_sc, sc[pbank], and pbank (S203).

[Memory update]:$ntv=ntv+(fv/fp)*r, mode[pbank]=0,$ $cur\_sc=$(scene change detection result), $sc[pbank]=cur\_sc, pbank=(pbank+$
    $1)\&(MAX\_BANK))-1)$ Then, the playing control unit 109a activates the motion search unit 109b, and performs a motion search process (S205).

Then, the playing control unit 109a activates the motion compensating unit 109d and performs a motion compensation process (S206).

Then, the playing control unit 109a updates values of the time counter tv and the time counter ntv (S207).

[Memory update]:$tv=tv+(fv/fp)*r, ntv=ntv+(fv/fp)*r$

Then, the playing control unit 109a is on standby until next VSYNC (S208), and then process returns to S205. The playing control unit 109a repeats the process of S205 to S208 until an instruction to stop slow motion playing is given.

Figure 25:
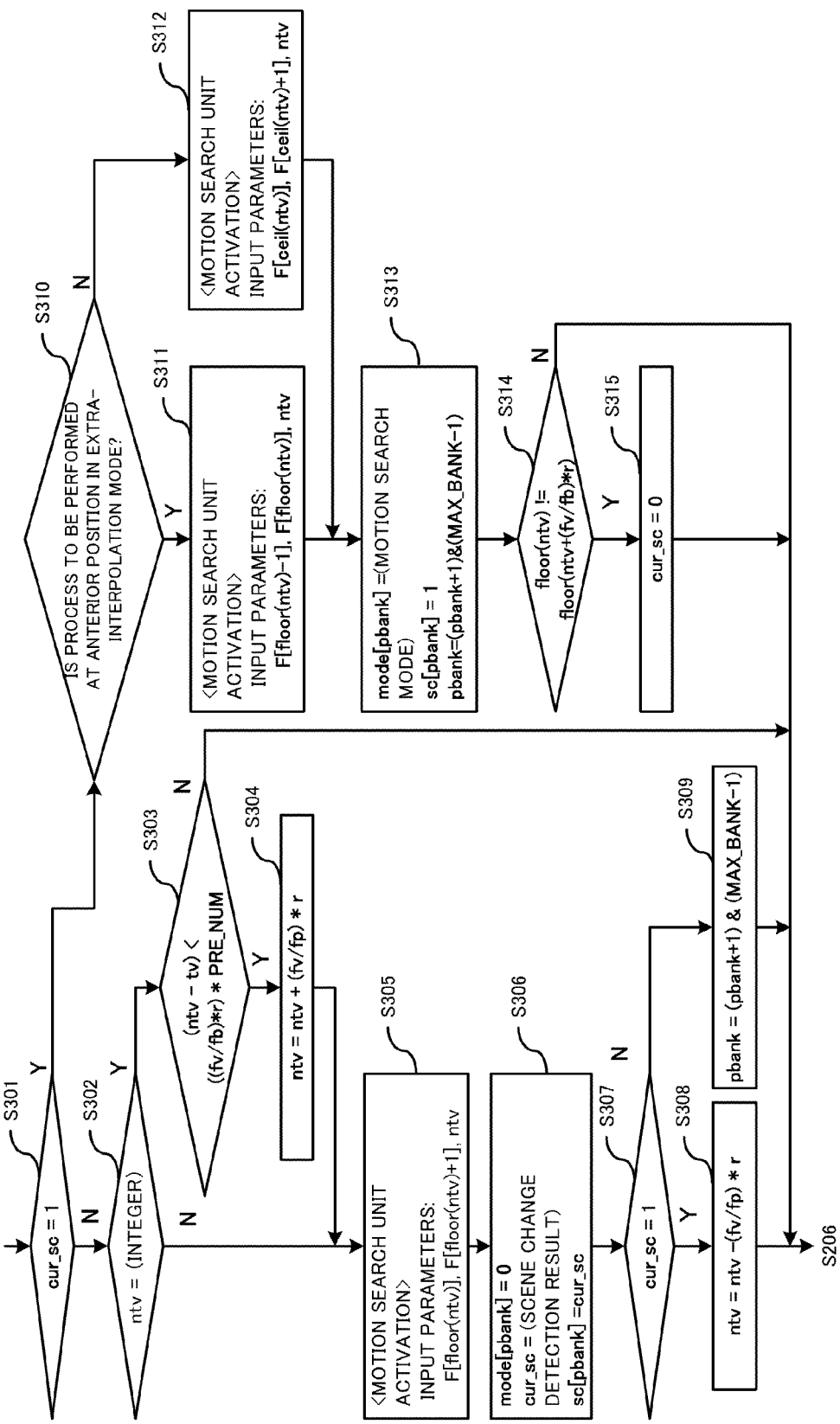
FIG. 25 is a flowchart illustrating a concrete example of a motion search process (S205).

FIG. 25 is a flowchart illustrating a concrete example of the motion search process (S205).

The playing control unit 109a determines whether the scene change detection flag cur_sc is 1, that is, whether a scene change has been detected (S301). When it is determined that no scene change has been detected (No in S301), the playing control unit 109a determines whether the value of the time counter ntv is an integer value (S302).

When the value of the time counter ntv is determined to be an integer value (Yes in S302), the playing control unit 109a determines whether a value of (ntv−tv) is smaller than a value of ((fv/fb)*r)*PRE_NUM (S303). PRE_NUM represents a number of frames in which a motion search is performed in advance. When the value of (ntv−tv) is determined to be smaller than the value of ((fv/fb)*r)*PRE_NUM (Yes in S303), the playing control unit 109a updates the value of the time counter ntv by the value of ntv+(fv/fp)*r (S304).

Meanwhile, when the value of (ntv−tv) is determined to be the value of ((fv/fb)*r)*PRE_NUM or more (No in S303), the process proceeds to S206 of FIG. 24. When the value of the time counter ntv is determined not to be an integer value (No in S302), the playing control unit 109a activates the motion search unit 109b using F[floor(ntv)], F[floor(ntv)+1], and ntv as input parameters (S305).

Then, the playing control unit 109a updates the variable values (S306).

[Memory update]:mode[pbank]=0,cur_sc=(scene change detection result),sc[pbank]=cur_sc Then, the playing control unit 109a determines whether a scene change has been detected based on the value of the scene change detection flag cur_sc (S307). When it is determined that the scene change has been detected (cur_sc=1) (Yes in S307), the playing control unit 109a updates the value of the time counter ntv by the value of ntv−(fv/fp)*r (S308).

Meanwhile, when it is determined that no scene change has been detected (cur_sc=0) (No in S307), the playing control unit 109a updates the value of pbank by a value of (pbank+1) & (MAX_BANK−1) (S309).

Further, when it is determined that the scene change has been detected (Yes in S301), the playing control unit 109a determines whether a process of generating an extrapolated frame from the frames before the scene change. (S310). When the frame is determined to be extrapolated from the frames before the scene change (Yes in S310), the playing control unit 109a activates the motion search unit 109b using F[floor(ntv)−1], F[floor(ntv)], and ntv as input parameters (S311).

On the other hand, when the extrapolation using the frames before the scene change is not performed (No in S310), the playing control unit 109a activates the motion search unit 109b using F[ceil(ntv)], F[ceil(ntv)+1], and ntv as input parameters (S312).

Then, the playing control unit 109a updates the variable values (S313).

[Memory update]:mode[pbank]=(motion search mode),sc[pbank]=1,pbank=(pbank+1)&(MAX_BANK−1)

Then, the playing control unit 109a determines whether a value of floor(ntv) is identical to a value of floor (ntv+(fv/fb)*r) (S314). Here, when the value of floor(ntv) is determined not to be identical to the value of floor (ntv+(fv/fb)*r) (Yes in S314), the playing control unit 109a initializes the scene change detection flag cur_sc to 0 (S315), and the process continues to S206 of FIG. 24. However, when the value of floor(ntv) is determined to be identical to the value of floor(ntv+(fv/fb)*r) (No in S314), the process steps to S206 of FIG. 24 without updating the scene change detection flag cur_sc.

Figure 26:
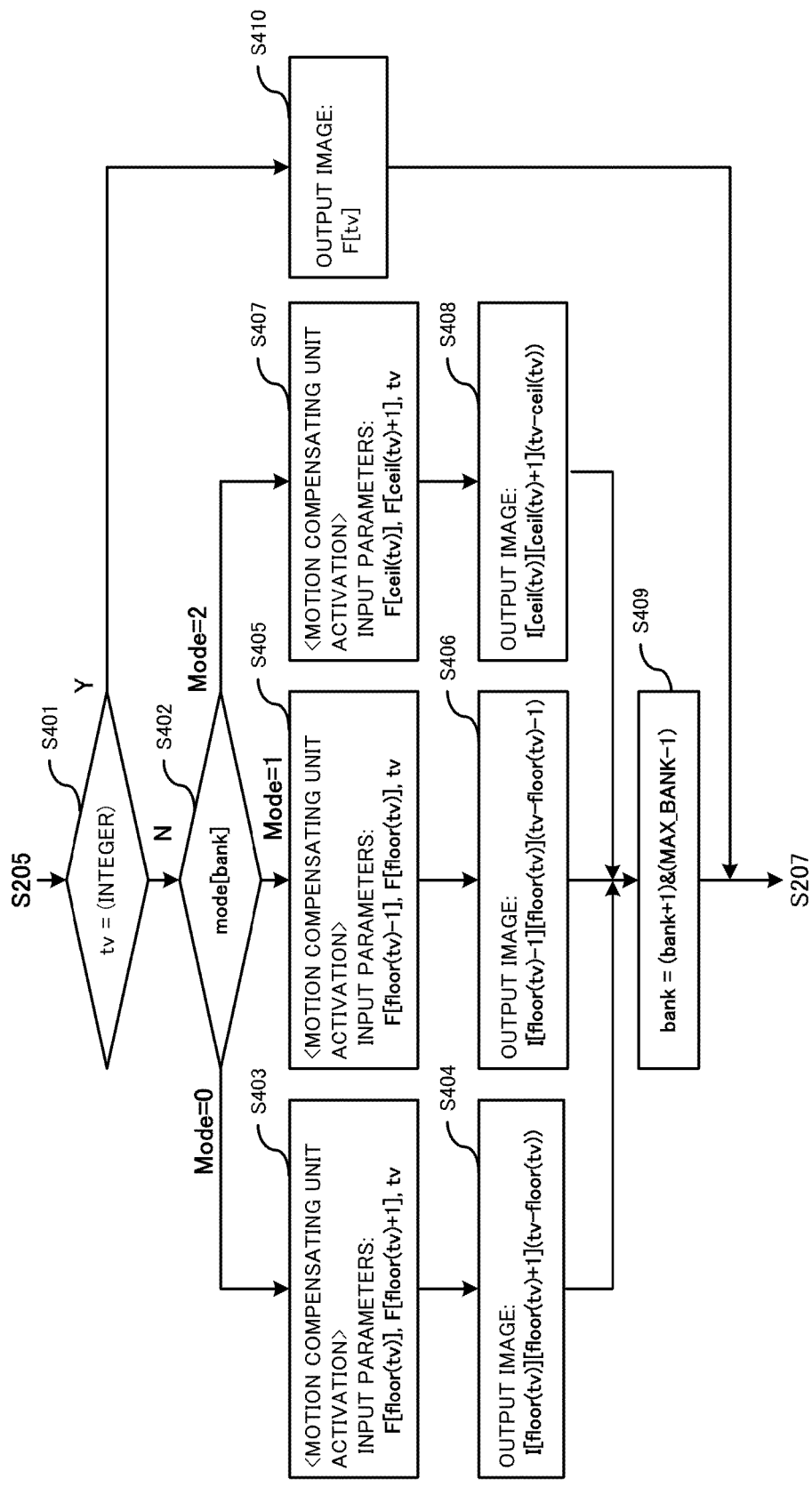
FIG. 26 is a flowchart illustrating a concrete example of a motion compensation process (S206)

FIG. 26 is a flowchart illustrating a concrete example of the motion compensation process (S206).

The playing control unit 109a determines whether the time counter tv is an integer value (S401). When the time counter tv is determined not to be an integer value (No in S401), the playing control unit 109a checks the mode indicating the mode of an extra- or inter-polation, mode [bank](S402). When the mode is "interpolation" mode (S402: mode[bank]=0), the playing control unit 109a activates the motion compensating unit 109d using F[floor(tv)], F[floor(tv)+1], and tv as input parameters (S403).

Then, the playing control unit 109a decides an interpolated frame I[floor(tv)] [floor(tv)+1](tv−floor (tv)) processed in the motion compensating unit 109d as an output image (S404), and then the process continues to S409.

Further, when the extra- or inter-polation mode is the "extrapolation using the frames before scene change" mode (S402: mode[bank]=1), the playing control unit 109a activates the motion compensating unit 109d using F[floor(tv)−1], F[floor(tv)], and tv as input parameters (S405).

Then, the playing control unit 109a decides an extrapolated frame I[floor(tv)−1][floor(tv)](tv−floor(tv)−1) processed in the motion compensating unit 109d as an output image (S406), and then process continues to S409.

Further, when the extra- or inter-polation mode is "extrapolation using the frames after scene change" mode (S402: mode[bank]=2), the playing control unit 109a activates the motion compensating unit 109d using F[ceil(tv)], F[ceil(tv)+1], and tv as input parameters (S407).

Then, the playing control unit 109a decides an extrapolated frame I[ceil(tv)][ceil(tv)+1](tv−ceil(tv)) processed in the motion compensating unit 109d as an output image (S408).

Then, the playing control unit 109a updates the value of the variable bank by the value of (bank+1) & (MAX_BANK−1) (S409), and then process continues to S207 of FIG. 24.

Meanwhile, when the time counter tv is determined to be an integer value (Yes in S401), the playing control unit 109a decides the frame F[tv] as an output image (S410), and then process steps to S207 of FIG. 24.

The main differences between the processing of the moving image player device 100 according to the present embodiment and the processing of conventional devices are following three points:

(1) Motion Search Performed in Advance

In the present embodiment, the motion search is performed in advance of an extra- or inter-polation image output by two or more time slots. Through this operation, when a scene change is detected, it is possible to output the extrapolated frames continuously.

(2) Behavior of Motion Search Related to Scene Change

In the present embodiment, when a scene change is detected, a motion search is performed on the same frame again in a state in which the scene change flag is set to 1 in a next time slot. Through this operation, the number of motion searches performed in advance is reduced, but when the motion search frame is a frame at an integer position, a next frame is subjected to a motion search. Further, in a motion search performed in a state in which a scene change is detected, extrapolation is performed on a motion vector from the frames before or after scene change. A direction in which extrapolation is performed on a motion vector is designated from the outside or decided by image information before and after a scene change.

(3) Behavior of Motion Compensation Related to Scene Change

In the present embodiment, an input frame to the motion compensating unit 109d is updated according to which process is performed at the time of a motion search. The process is one of interpolation, extrapolation from the frames before a scene change, or extrapolation from the frames after a scene change.

As described above, in the present embodiment, when a scene change is detected, extrapolated frames that have been generated from frames before and/or after the scene change, and thus slow motion playing can be performed while maintaining smoothness of a display before and after the scene change.

Third Embodiment

In a third embodiment, when a scene change is detected at the time of smooth slow playing, interpolated frames generated by applying a video effect to display frames before and after the scene change are inserted.

Figure 27:
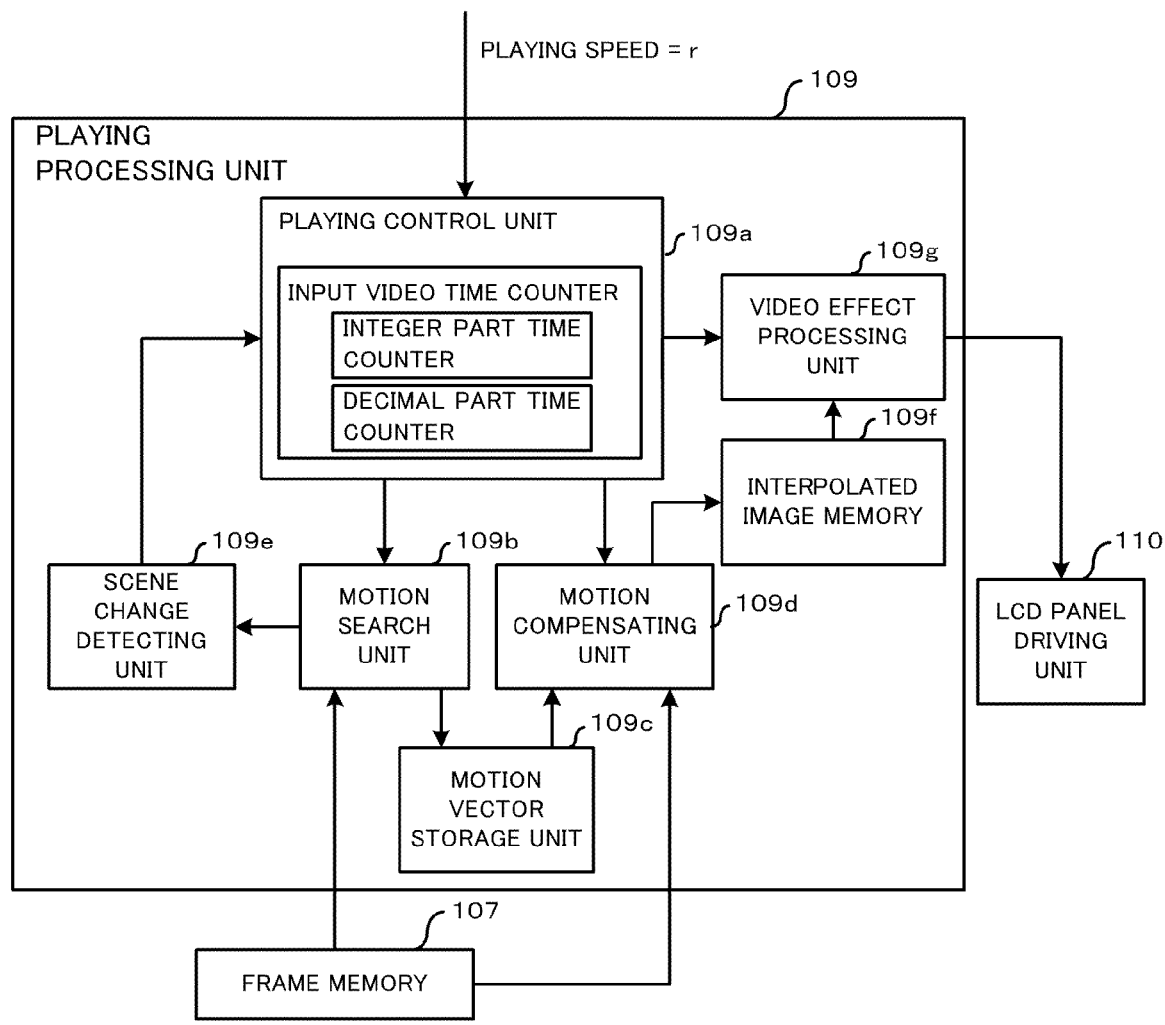
FIG. 27 is a block diagram of a playing processing unit of a moving image player device according to a third embodiment.

FIG. 27 is a block diagram illustrating an exemplary configuration of a playing processing unit 109 of a moving image player device 100 according to the present embodiment. The playing processing unit 109 further includes an interpolated image memory 109f and a video effect processing unit 109g.

The interpolated image memory 109f holds an interpolated image that has been subjected to motion compensation. The video effect processing unit 109g generates a new frame, for example, by applying a video effect of overlapping two or more consecutive frames while changing a relative weight (display ratio) of the two or more consecutive frames among a plurality of frames or interpolated frames input from the frame memory 107 based on a positional relation on a time axis.

The video effect includes not only common video processing such as reversion, keying, stylize, cross-fade, and wipe but also using an original image without change. Further, a video effect generated from two images can be implemented by adjusting a relative weight of the two images by a variable representing a frame playing position. The interpolated image memory 109f and the video effect processing unit 109g configure a video effect processing unit.

Figure 28:
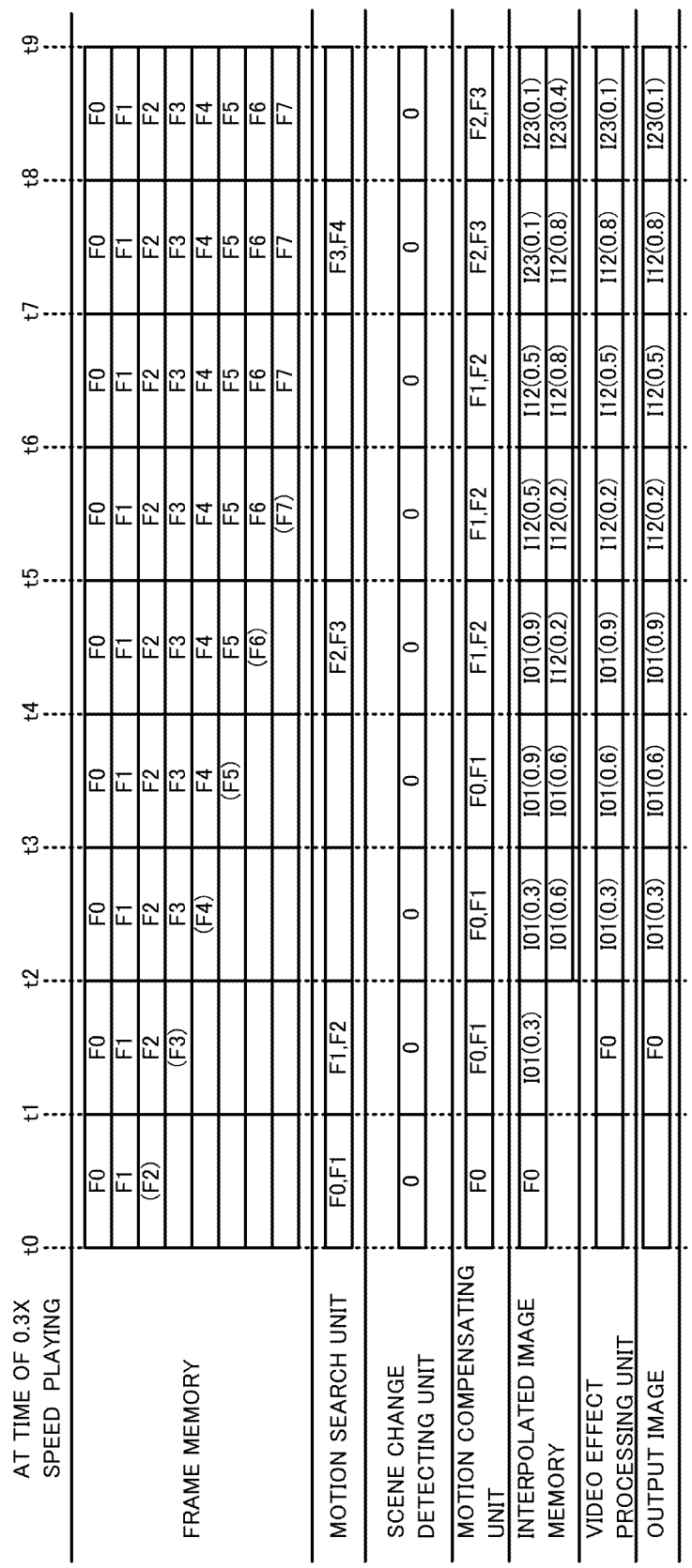
FIG. 28 is a diagram illustrating processing performed when a playing processing unit according to the third embodiment detects no scene change.

FIG. 28 is a diagram illustrating processing performed when the playing processing unit 109 according to the present embodiment detects no scene change. An output image has a latency of one time slot from a motion search. Here, the content of the interpolated image memory 109f representing interpolated frames that can be input to the video effect processing unit 109g is illustrated as well. In the example of FIG. 28, the motion search result between the respective input frames is held, and the motion compensating unit 109d refers to the motion search result necessary for generation of an interpolated frame, and thus a motion search between the respective input frames is performed once.

In the present embodiment, the motion compensating unit 109d is not operated at a time corresponding to a scene change position, the video effect processing unit 109g is activated using an image read from the interpolated image memory 109f as an input, and an interpolated image is generated and played.

Figure 29:
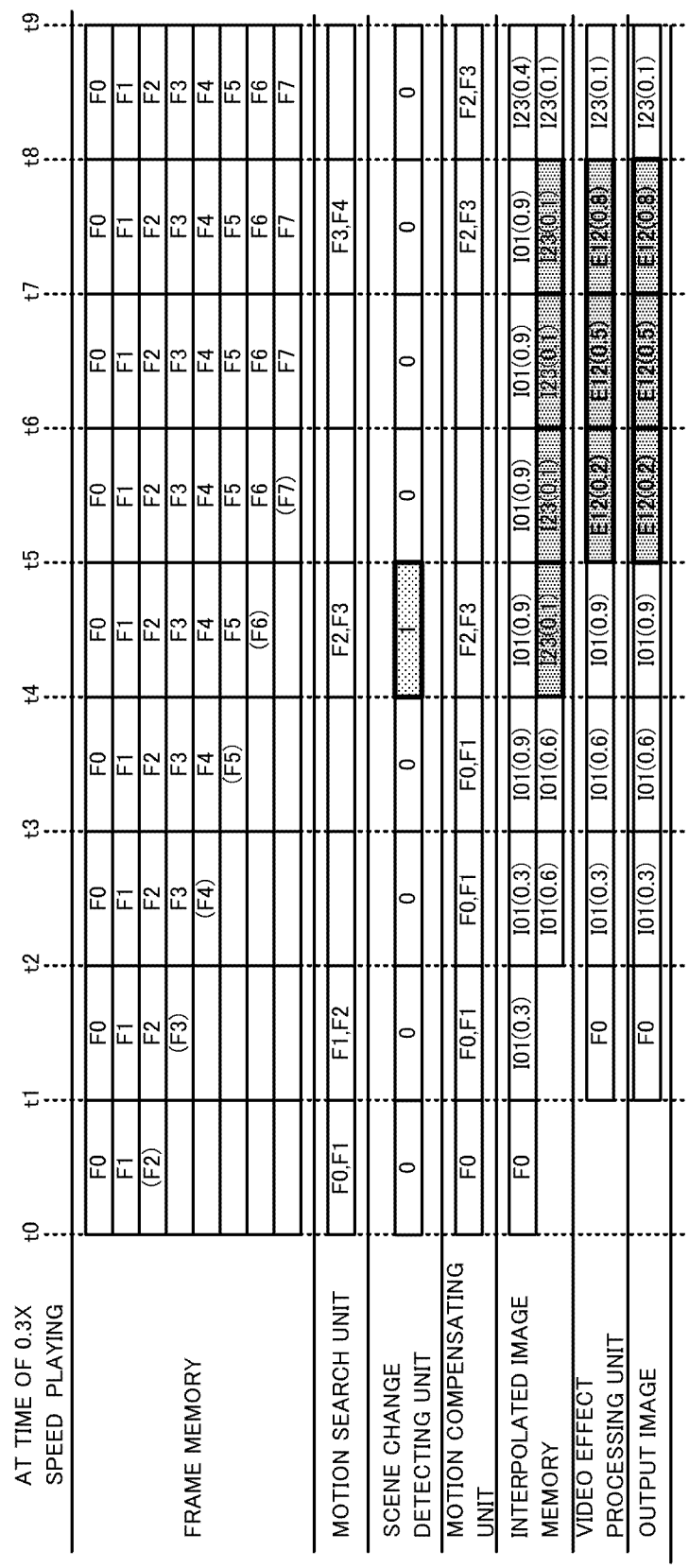
FIG. 29 is a diagram illustrating a time-series change in the content of a frame memory, a processing target frame of a motion search unit, a scene change detection result of a scene change detecting unit, a processing target frame of a motion compensating unit, the content of an interpolated image memory, a frame generated by a video effect processing unit, and an output image when a scene change is detected.

FIG. 29 is a diagram illustrating a time-series change in the content of the frame memory 107, the processing target frame of the motion search unit 109b, the scene change detection result of the scene change detecting unit 109e, the processing target frame of the motion compensating unit 109d, the content of the interpolated image memory 109f, an interpolated frame generated by the video effect processing unit 109g, and an output image when a scene change is detected. There is a scene change between the frames F1 and F2. The scene change detection result based on the motion search result of the frames F1 and F2 becomes 1 at a time t4, motion compensation is performed up to a position representing a portion between the frames F2 and F3 at times t4 to t5, and the motion compensating unit 109d stops at times t5 to t7. Further, a process of generating and outputting an interpolated frame to which a video effect is applied based on two frames stored in the interpolated image memory 109f is performed at times t5 to t8.

Figure 30:
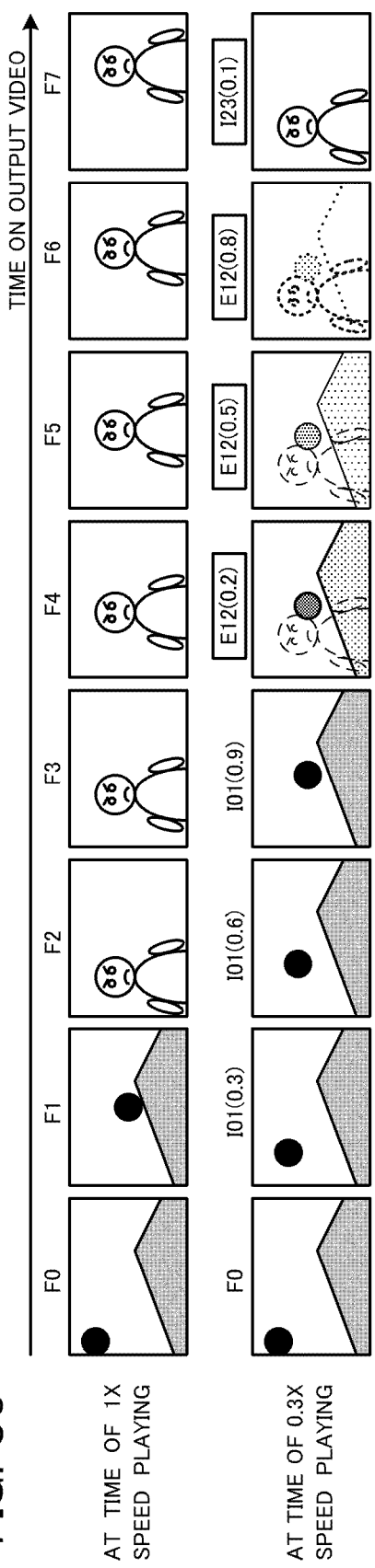
FIG. 30 is a diagram illustrating a concrete example of an output image corresponding to FIG. 29.

FIG. 30 is a diagram illustrating a concrete example of an output image corresponding to FIG. 29. An interpolated frame E12(0.2) in a scene change is displayed subsequently to an interpolated frame I01(0.9) which is an anterior scene. The interpolated frame E is a frame having a video effect applied thereto. Following E12 (0.2), interpolated frames E12(0.5), E12(0.8), and I23(0.1) are displayed in order. The video effect process is performed and playing is performed while maintaining a frame playing time interval, and thus a smooth display can be maintained even when there is a scene change.

Figure 31:
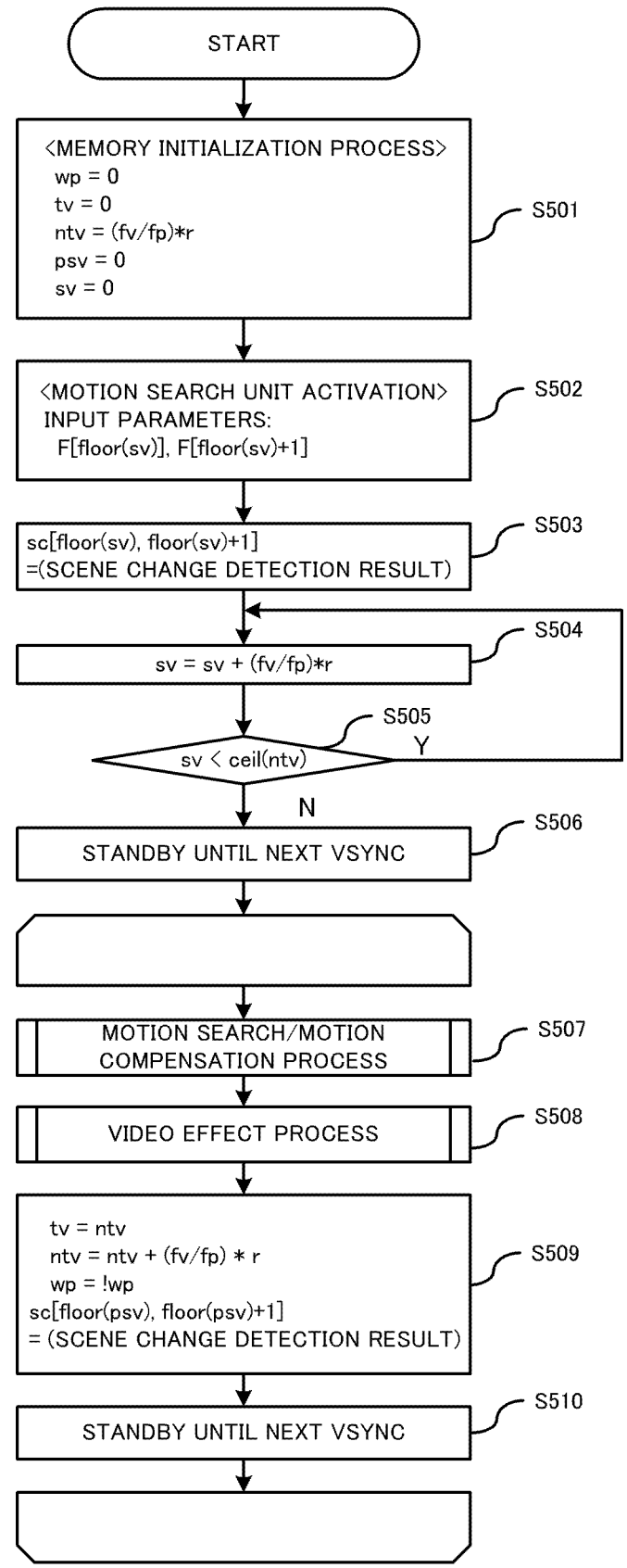
FIG. 31 is a flowchart illustrating exemplary processing of a playing control unit illustrated in FIG. 27.

FIG. 31 is a flowchart illustrating exemplary processing of the playing control unit 109a according to the present embodiment. A last input frame or a last displayed interpolated frame in a scene before a scene change and a first input frame or a first displayed interpolated frame in a scene after a scene change are candidates input to the video effect processing unit 109g.

The playing control unit 109a initializes variables stored in the memory as follows. A variable wp designates an output bank of an interpolated image memory in the motion compensating unit 109d (S501). Variables sv and psv are variables used in the process that is performed in advance in the motion search unit 109b.

[Memory initialization]:$wp=0, tv=0, ntv=(fv/fp)*r,$
$psv=0, sv=0$

Then, the playing control unit 109a activates the motion compensating unit 109d using F[floor(sv)] and F[floor(sv)+1] as input parameters (S502).

Then, the playing control unit 109a stores a scene change detection result in sc[floor(sv), floor(sv)+1] (S503).

Then, the playing control unit 109a updates a value of the variable sv by a value of sv+(fv/fp)*r (S504).

Then, the playing control unit 109a determines whether the value of the variable sv is smaller than a value of ceil(ntv) (S505). When the value of the variable sv is determined to be smaller than the value of ceil(ntv) (Yes in S505), the process returns to S504.

Meanwhile, when the value of the variable sv is determined to be the value of ceil(ntv) or more (No in S505), the playing control unit 109a sequentially activates the motion search unit 109b and the motion compensating unit 109d, and acquires a processing result thereof (S507).

Then, the playing control unit 109a activates the video effect processing unit 109g, and acquires a processing result thereof (S508).

Then, the variables stored in the memory are updated (S509).

[Memory update]:$tv=ntv, ntv=ntv+(fv/fp)*r, wp=!wp, sc$
[floor($psv$),floor($psv$)+1]=(scene change detection result)

Then, the playing control unit 109a is on standby until next VSYNC (S510), and the process of S507 to S510 is repeated until an instruction to stop slow playing is given.

Figure 32:
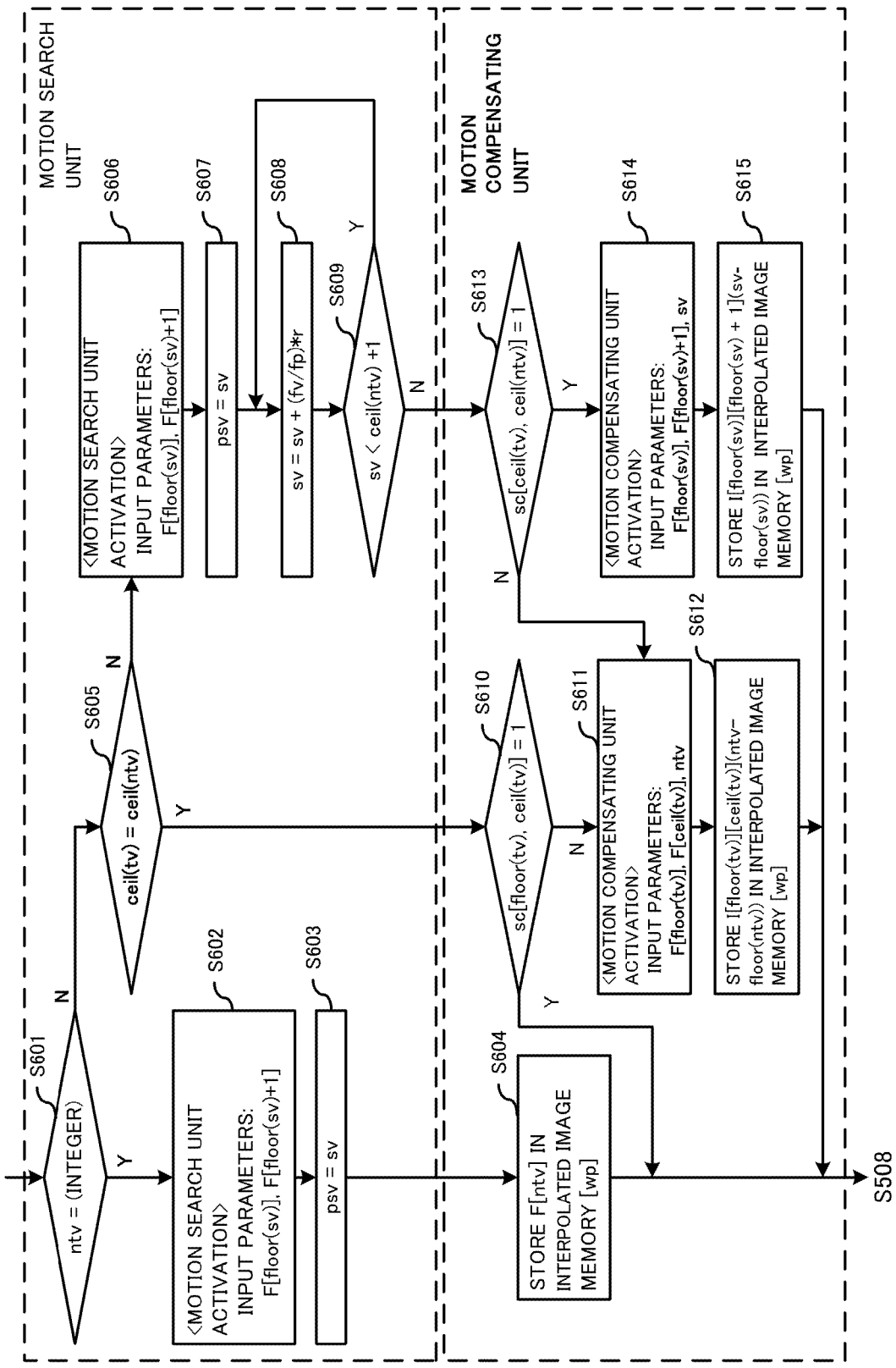
FIG. 32 is a flowchart illustrating a concrete example of a motion search/motion compensation process (S507)

FIG. 32 is a flowchart illustrating a concrete example of a motion search/motion compensation process of S507 of FIG. 31.

The playing control unit 109a determines whether the value of the time counter ntv is an integer value (S601). When the value of the time counter ntv is determined to be an integer value (Yes in S601), the playing control unit 109a activates the motion search unit 109b using F[floor(sv)] and F[floor(sv)+1] as input parameters (S602).

Then, the motion search unit 109b updates the value of variable psv by the value of the variable sv (S603).

Then, the playing control unit 109a stores a frame F[ntv] in an interpolated image memory [wp](S604), and then the process proceeds to S508 of FIG. 31.

Meanwhile, when the value of the time counter ntv is determined not to be an integer value (No in S601), the playing control unit 109a determines whether the value of ceil(tv) is equal to the value of ceil(ntv) (S605). When the value of ceil(tv) is determined to be equal to the value of ceil(ntv) (Yes in S605), the process proceeds to S610. On the other hand, if the value of ceil(tv) is determined to be different from the value of ceil(ntv) (No in S605), the playing control unit 109a activates the motion search unit 109b using F[floor(sv)] and F[floor(sv)+1] as input parameters (S606).

Then, the motion search unit 109b updates the value of the variable psv by the value of the variable sv (S607).

Then, the motion search unit 109b updates the value of the variable sv by the value of sv+(fv/fp)*r (S608).

Then, the motion search unit 109b determines whether the value of the variable sv is smaller than the value of ceil (ntv)+1 (S609). When the value of the variable sv is determined to be smaller than the value of ceil(ntv)+1 (Yes in S609), the process returns to S608. However, when the value of the variable sv is determined to be the value of ceil(ntv)+1 or more (No in S609), the process proceeds to S613.

Further, when the value of ceil(tv) is determined to be equal to the value of ceil(ntv) (Yes in S605), the playing control unit 109a determines whether a value of sc[floor(tv), ceil(tv)] is 1 (S610). When the value of sc[floor(tv), ceil(tv)] is 1, that is, when a scene change is detected (Yes in S610), the process proceeds to S508 of FIG. 31.

Meanwhile, when the value of sc[floor(tv), ceil(tv)] is 0 (No in S610), the playing control unit 109a activates the motion compensating unit 109d using F[floor(tv)], F[ceil (tv)], and ntv as input parameters (S611).

Then, the playing control unit 109a stores the interpolated frame I[floor(tv)] [ceil(tv)](ntv−floor(ntv)) generated by the motion compensating unit 109d in the interpolated image memory [wp](S612), and then the process proceeds to S508 of FIG. 31.

Further, when the value of the variable sv is determined to be the value of ceil(ntv)+1 or more (No in S609), the playing control unit 109a determines whether the value of sc [ceil(tv), ceil(ntv)] is 1 (S613). When the value of sc[ceil (tv), ceil(ntv)] is 0 (No in S613), the process proceeds to S611.

Meanwhile, when the value of sc[ceil(tv), ceil(ntv)] is 1, that is, when a scene change is detected (Yes in S613), the playing control unit 109a activates the motion compensating unit 109d using F[floor(sv)], F[floor(sv)+1], and sv as input parameters (S614).

Then, the playing control unit 109a stores the interpolated frame I[floor(sv)] [floor(sv)+1](sv−floor(sv)) generated by the motion compensating unit 109d in the interpolated image memory [wp](S615), and then the process proceeds to S508 of FIG. 31.

Figure 33:
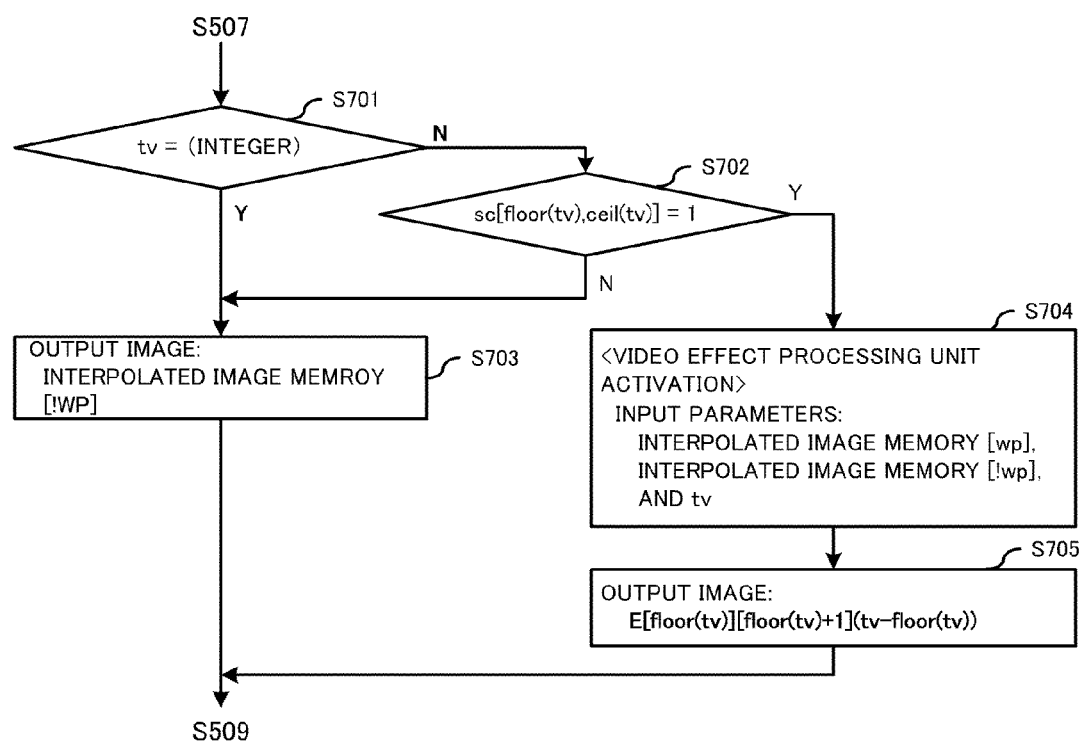
FIG. 33 is a flowchart illustrating a concrete example of a video effect process (S508)

FIG. 33 is a flowchart illustrating a concrete example of the video effect process of S508 of FIG. 31.

The playing control unit 109a determines whether the value of the time counter tv is an integer value (S701). When the value of the time counter tv is determined to be an integer value (Yes in S701), the playing control unit 109a decides a frame stored in the interpolated image memory [!wp] as an output image (S703), and then the process proceeds to S509 of FIG. 32.

Meanwhile, when the value of the time counter tv is determined not to be an integer value (No in S701), the playing control unit 109a determines whether the value of sc[floor(tv),ceil(tv)] is 1, that is, when a scene change has been detected (S702). When it is determined that no scene change has been detected (No in S702), the process proceeds to S703.

However, when it is determined that a scene change has been detected (Yes in S702), the playing control unit 109a activates a video effect processing unit 109f using the interpolated image memory [wp], the interpolated image memory [!wp], and tv as input parameters (S704).

Then, the playing control unit 109a decides the frame E[floor(tv)] [floor(tv)+1](tv−floor(tv)) generated by the video effect processing unit 109g as an output image (S705), and then the process proceeds to S509 of FIG. 32.

According to the moving image player device 100 according to the present embodiment, it is possible to further increase choices of a display device according to a video effect while maintaining smoothness of a display before and after a scene change.

Modified Example (1) of Third Embodiment

Figure 34:
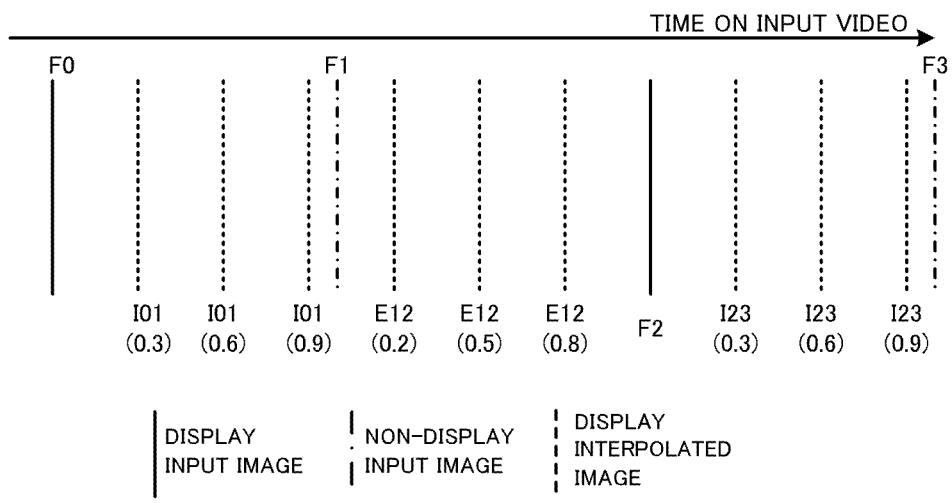
FIG. 34 is a diagram illustrating a time-series positional relation of an image output when a moving image playing device according to a modified example of the third embodiment detects a scene change at the time of 0.3× playing.

It is possible to maintain a input video time counter until switching from a first scene to a second scene is performed and reset the time counter to a value representing the frame at the head of the second scene afterwards. FIG. 34 is a diagram illustrating a time-series positional relation of an image output when a moving image playing device according to a modified example of the third embodiment detects a scene change at the time of 0.3× playing. In this case, an interpolated frame E12( ) is generated using an interpolated frame I01(0.9) and an input frame F2. In this case, when a time at which a scene change is detected comes, the frame F2 may be stored in the interpolated image memory without activating the motion compensating unit.

Modified Example (2) of Third Embodiment

Figure 35:
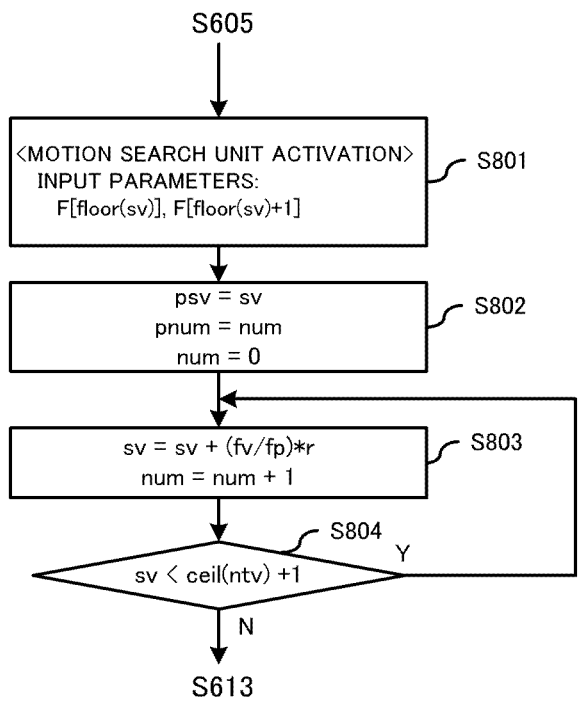
FIG. 35 is a flowchart illustrating a process performed instead of S606 to S609 of FIG. 32.

In the present embodiment, a counter that holds the number of frames to be interpolated between frames when the motion search unit 109b is activated may be provided. FIG. 35 is a flowchart illustrating a process performed instead of S606 to S609 of FIG. 32. A variable num represents a count value for the motion search unit 109b that is performed in advance, and a variable pnum represents a count value used by the video effect processing unit 109g.

The playing control unit 109a activates the motion search unit 109b using F[floor(sv)] and F[floor(sv)+1] as input parameters (S801).

Then, the playing control unit 109a initializes the variables psv, pnum, and num (S802).

[Memory initialization]:$psv=sv, pnum=num, num=0$

Then, the playing control unit 109a updates the variable sv by sv+(fv/fp)*r, and adds 1 to the variable num (S803).

Then, the playing control unit 109a determines whether the variable sv is smaller than ceil(ntv)+1 (S804). Here, when the variable sv is determined to be smaller than ceil(ntv)+1 (Yes in S804), the process returns to S803. However, when the variable sv is determined to be the value of ceil(ntv) or more (No in S804), the process proceeds to S613 of FIG. 32.

When smooth slow playing is performed, the number of interpolated frames to be inserted between input frames varies according to the playing speed and the current playing position, but it is possible to calculate an arbitrary position of a frame corresponding to, for example, a middle point or a ⅓ point of a time-series positional relation through the counter, and it is possible to obtain more video effects by applying an arbitrary image other than an input image to a desired position.

For example, a variable ctv=tv+(fv/fp*r)*ceil(pnum/2) is set, a frame at a time position of ctv is regarded a frame positioned at the temporal middle of the scene change in terms of a time, so that a fully black image is obtained. It is possible to generate a scene that naturally blackouts by cross-fading with a frame lastly displayed in a first scene. Similarly, it is possible to generate a scene that fades in from black by combining with a frame presented first in a second scene. Further, by changing the number of frames corresponding to a temporal middle position to one or two according to whether the number of frames interpolated between the first scene and the second scene is an odd number or an even number, it is possible to prevent, for example, an unnatural display in which the second scene starts to fade in while the first scene is fading out toward black.

Further, when the variable n is set to an integer which is equal to or less than a value of the counter, it is possible to apply images P0 to P(n−1) of an arbitrary pattern to n interpolated frames among interpolated frames between the first scene and the second scene, generate scenes having different video effects such that starting from the end of the first scene, P0 is set as a scene 1a, P1 is set as a scene 1b, . . . , Pn-2 and Pn-1 are set as a scene 2a, and Pn is set as a scene 2b, and consecutively playing the first scene, the scene 1a, the scene 1b, . . . , the scene 2a, the scene 2b, . . . , and the second scene.

Modified Example (3) of Third Embodiment

The third embodiment may be combined with the second embodiment. In this case, even during a scene change, the motion compensating unit 109d may be activated to update the content of the interpolated image memory. It is possible to apply a video effect to a frame inserted between frames before and after the scene change by extrapolation of the motion search result.

Fourth Embodiment

Figure 36:
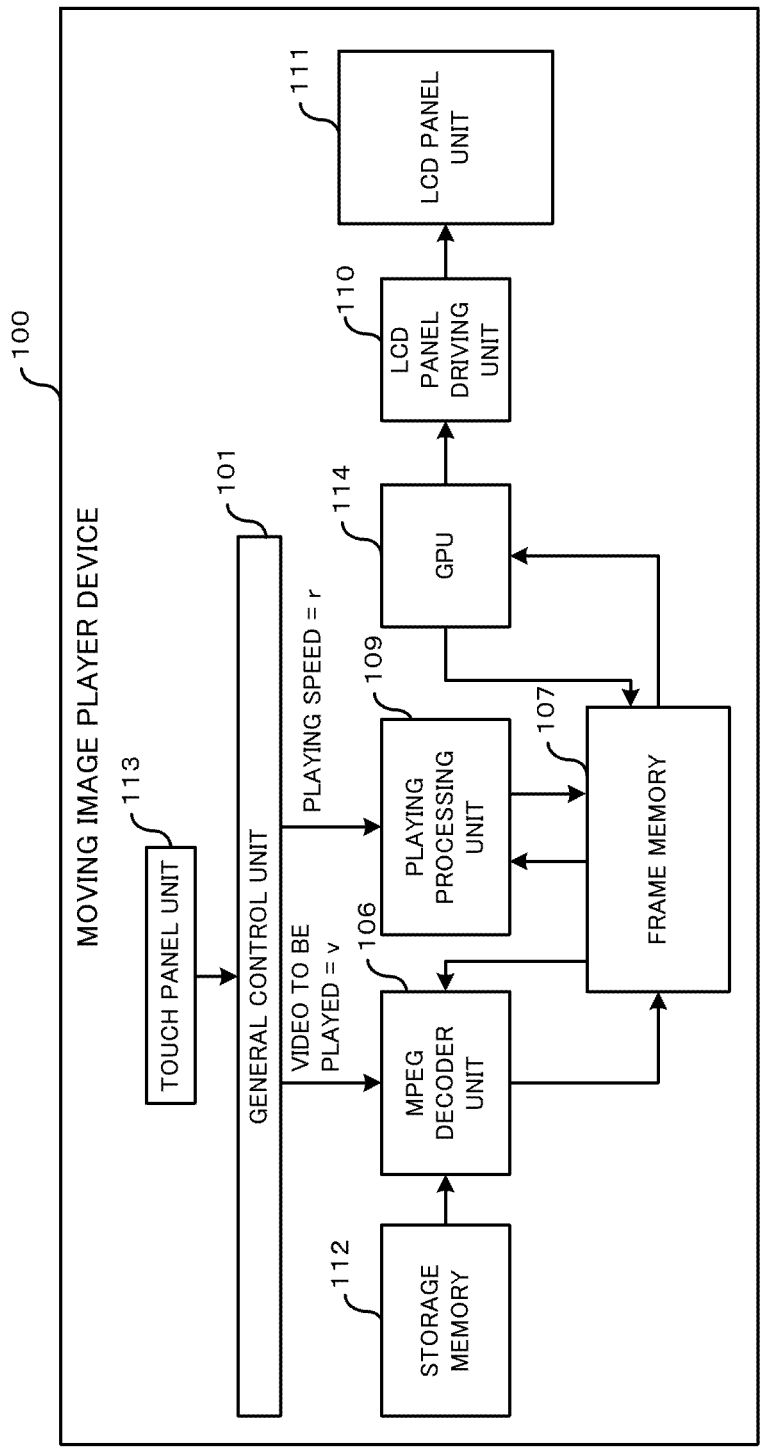
FIG. 36 is a block diagram of a moving image player device according to a fourth embodiment.

FIG. 36 is a block diagram of a moving image player device 100 according to the present embodiment. The moving image player device 100 is a tablet terminal in which a liquid crystal (LC) panel is integrated with a touch panel. The same reference numerals as those in FIG. 1 denote the same components. The following description will proceed with different points.

A storage memory 112 is a large-capacity storage memory capable of accumulating a plurality of videos such as a NAND flash memory. A touch panel unit 113 detects a position on a screen through a sensor and performs a corresponding operation when the user touches the screen by a finger or a dedicated pen.

The general control unit 101 selects a video v to be played from among a plurality of videos stored in the storage memory 112 based on an input from the touch panel unit 113. The general control unit 101 outputs the video v to be played to the MPEG decoder unit 106, and outputs the playing speed r to the playing processing unit 109. Further, the general control unit 101 writes image data representing an elapsed time in a video which is displayed together with the video currently playing, texture data representing a button of an operation panel used to change the playing speed and the texture of the operation panel, and the like in the frame memory 107.

The MPEG decoder unit 106 reads a video file including the frame rate fv corresponding to the video v from the storage memory 112. The MPEG decoder unit 106 decodes an image according to a decoding scheme designated in the file, and outputs the decoding result to the frame memory 107.

A GPU 114 reads the image data or the texture data from the frame memory 107, performs texture mapping, combines the read image data or the read texture data with the video of the playing processed result in the frame memory 107, and outputs the resultant data to the LCD panel driving unit 110. An internal operation and effects of the playing processing unit 109 are the same as in the first to third embodiments.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:
1. A moving image player device, comprising:
   a video input unit that receives a video consisting of a plurality of consecutive input frames;
   an interpolated image generating unit that generates interpolated frames, each of which corresponding to a time between two adjacent input frames, using the two input frames among the plurality of input frames; and
   a video playing unit that detects scene changes in the video, and based on the detection results, plays the video at an arbitrary playing speed by outputting the plurality of input frames or the interpolated frames in time series,
   wherein when the scene change is detected, after displaying an input frame of a first scene or an interpolated frame of the first scene, the video playing unit skips display of the interpolated frames corresponding to time between an input frame at the end of a first scene and an input frame at the head of a second scene, and displays an input frame of the second scene or an interpolated frame of the second scene,
   wherein when the scene change is detected between a first input frame at the end of the first scene and a second input frame at the head of the second scene,
   the video playing unit displays a first interpolated frame generated using the first input frame and a third input frame that is adjacent immediately before the first input frame, the second input frame, and a second interpolated frame generated using the second input frame and a fourth input frame that is adjacent immediately after the second input frame in time series.
2. A moving image player device, comprising:
   a video input unit that receives a video consisting of a plurality of consecutive input frames;

an interpolated image generating unit that generates interpolated frames, each of which corresponding to a time between two adjacent input frames, using the two input frames among the plurality of input frames; and a video playing unit that detects scene changes in the video, and based on the detection results, plays the video at an arbitrary playing speed by outputting the plurality of input frames or the interpolated frames in time series, wherein when the scene change is detected, after displaying an input frame of a first scene or an interpolated frame of the first scene, the video playing unit skips display of the interpolated frames corresponding to time between an input frame at the end of a first scene and an input frame at the head of a second scene, and displays an input frame of the second scene or an interpolated frame of the second scene, wherein when the scene change is detected between a first input frame at the end of the first scene and a second input frame at the head of the second scene, the video playing unit displays a first interpolated frame generated using the first input frame and a third input frame that is adjacent immediately before the first frame, the first input frame, a second interpolated frame that is generated using the second input frame and a fourth input frame that is adjacent immediately after the second input frame, and the fourth input frame in time series.

3. A moving image player device, comprising:

a video input unit that receives a video consisting of a plurality of consecutive input frames;

an extrapolated or interpolated image generating unit that generates extrapolated or interpolated frames, each of which corresponding to a time between or outside two adjacent input frames, using the two input frames among the plurality of input frames; and a video playing unit that detects a scene change in the video, and based on the detection results, plays the video at an arbitrary playing speed by outputting the plurality of input frames, the extrapolated frames, or the interpolated frames in time series, wherein when the scene change is detected, after displaying an input frame of a first scene or an interpolated frame of the first scene, the video playing unit displays extrapolated frames that are generated based on a plurality of input frames configuring an end part of the first scene or a head part of the second scene by the extrapolated or interpolated image generating unit, wherein when the scene change is detected, the video playing unit displays an forward extrapolated frame generated at a later position on a time axis than an input frame at the end of the first scene based on the input frame at the end of the first scene and an input frame immediately before the input frame at the end of the first scene by the extrapolated or interpolated image generating unit subsequently to the input frame at the end of the first scene.

4. A moving image player device, comprising:

a video input unit that receives a video consisting of a plurality of consecutive input frames;

an extrapolated or interpolated image generating unit that generates extrapolated or interpolated frames, each of which corresponding to a time between or outside two adjacent input frames, using the two input frames among the plurality of input frames; and a video playing unit that detects a scene change in the video, and based on the detection results, plays the video at an arbitrary playing speed by outputting the plurality of input frames, the extrapolated frames, or the interpolated frames in time series, wherein when the scene change is detected, after displaying an input frame of a first scene or an interpolated frame of the first scene, the video playing unit displays extrapolated frames that are generated based on a plurality of input frames configuring an end part of the first scene or a head part of the second scene by the extrapolated or interpolated image generating unit, wherein when the scene change is detected, the video playing unit displays a backward extrapolated frame that is generated at an earlier position on the time axis than an input frame at the head of the second scene based on the input frame at the head of the second scene and an input frame immediately after the input frame at the head of the second scene by the extrapolated or interpolated image generating unit subsequently to the input frame at the end of the first scene.

5. A moving image player device, comprising:

a video input unit that receives a video consisting of a plurality of consecutive input frames;

an interpolated image generating unit that generates interpolated frames, each of which corresponding to a time between two adjacent input frames, using the two input frames among the plurality of input frames;

a video effect processing unit that generates new interpolated frames in which two or more consecutive frames among the plurality of input frames or the interpolated frames are overlapped while changing a relative weight of the two or more frames based on a positional relation on a time axis; and a video playing unit that detects a scene change in the video, and based on the detection results, plays the video at an arbitrary playing speed by outputting the plurality of input frames, the interpolated frames, or the new interpolated frames in time series, wherein when the scene change is detected, after displaying an input frame of a first scene or an interpolated frame of the first scene, the video playing unit displays the new interpolated frames corresponding to time between an input frame at the end of the first scene and an input frame at the head of a second scene, and displays an input frame of the second scene or the interpolated frame of the second scene.

6. The moving image player device according to claim 5, when the video playing unit detects the scene change between a first input frame at the end of the first scene and a second input frame at the head of the second scene, the video effect processing unit generates the new interpolated frames using two or more frames from among the first input frame, a first interpolated frame that is closest in the position on the time axis to the first input frame among interpolated frames generated from the first input frame and a third input frame that is adjacent immediately before the first input frame, the second input frame, and a second interpolated frame that is closest in the position on the time axis to the second input frame among interpolated frames generated from the second input frame and a fourth input frame that is adjacent immediately after the second input frame.

* * * * *